(12) United States Patent
Tadokoro et al.

(10) Patent No.: US 11,168,170 B2
(45) Date of Patent: Nov. 9, 2021

(54) CLEARANCE NARROWING MATERIAL, CLEARANCE NARROWING MATERIAL COMPOSITE, AND ARTICLE USING SAME

(71) Applicants: KYOTO UNIVERSITY, Kyoto (JP); NATIONAL UNIVERSITY CORPORATION YOKOHAMA NATIONAL UNIVERSITY, Yokohama (JP); NATIONAL INSTITUTE OF TECHNOLOGY, Tokyo (JP)

(72) Inventors: Chiharu Tadokoro, Saitama (JP); Takuo Nagamine, Saitama (JP); Yoshinobu Tsujii, Kyoto (JP); Keita Sakakibara, Kyoto (JP); Ken Nakano, Yokohama (JP); Hitoshi Hattori, Yokohama (JP); Shinya Sasaki, Tokyo (JP); Takaya Sato, Yamagata (JP)

(73) Assignees: KYOTO UNIVERSITY, Kyoto (JP); NATIONAL UNIVERSITY CORPORATION YOKOHAMA NATIONAL UNIVERSITY, Kanagawa (JP); NATIONAL INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 16/607,825

(22) PCT Filed: Apr. 25, 2018

(86) PCT No.: PCT/JP2018/016855
§ 371 (c)(1),
(2) Date: Oct. 24, 2019

(87) PCT Pub. No.: WO2018/199181
PCT Pub. Date: Nov. 1, 2018

(65) Prior Publication Data
US 2020/0181309 A1  Jun. 11, 2020

(30) Foreign Application Priority Data

Apr. 25, 2017  (JP) .............................. JP2017-086599

(51) Int. Cl.
*C08F 292/00* (2006.01)
(52) U.S. Cl.
CPC ................................ *C08F 292/00* (2013.01)
(58) Field of Classification Search
None
See application file for complete search history.

(56) References Cited

U.S. PATENT DOCUMENTS

| 6,692,914 | B1 * | 2/2004 | Klaerner | .................. | C08F 4/00 |
| | | | | | 435/6.11 |
| 9,982,105 | B2 | 5/2018 | Minagawa | | |
| 2019/0119596 | A1 | 4/2019 | Tsujii et al. | | |

FOREIGN PATENT DOCUMENTS

| JP | H11263819 A | 9/1999 |
| JP | 3422463 B2 | 4/2003 |

(Continued)

OTHER PUBLICATIONS

International Preliminary Report on Patentability dated Oct. 31, 2019 from corresponding application No. PCT/JP2018/016855 with English Translation.

(Continued)

*Primary Examiner* — Jeffrey D Washville
(74) *Attorney, Agent, or Firm* — Browdy and Neimark, PLLC

(57) ABSTRACT

A clearance narrowing material containing a brush-shaped polymer chain aggregate formed of multiple polymer chains immobilized on a substrate. The invention provides a clearance narrowing material which can effectively prevent fluid leakage through a clearance and which does not disturb relative movement of members to form a clearance, and can (Continued)

realize an article in which fluid leakage through a clearance can be effectively prevented and the members to form a clearance can move smoothly.

18 Claims, 5 Drawing Sheets

(56) References Cited

FOREIGN PATENT DOCUMENTS

| | | |
|---|---|---|
| JP | 2006316169 A | 11/2006 |
| JP | 2008267572 A | 11/2008 |
| JP | 2014169787 A | 9/2014 |
| JP | 2014210129 A | 11/2014 |
| JP | 2016210956 A | 12/2016 |
| WO | 2016042912 A1 | 3/2016 |
| WO | 2017171071 A1 | 10/2017 |

OTHER PUBLICATIONS

International Search Report dated Apr. 25, 2018 from corresponding application No. PCT/JP2018/016855.

\* cited by examiner

[FIG. 1]
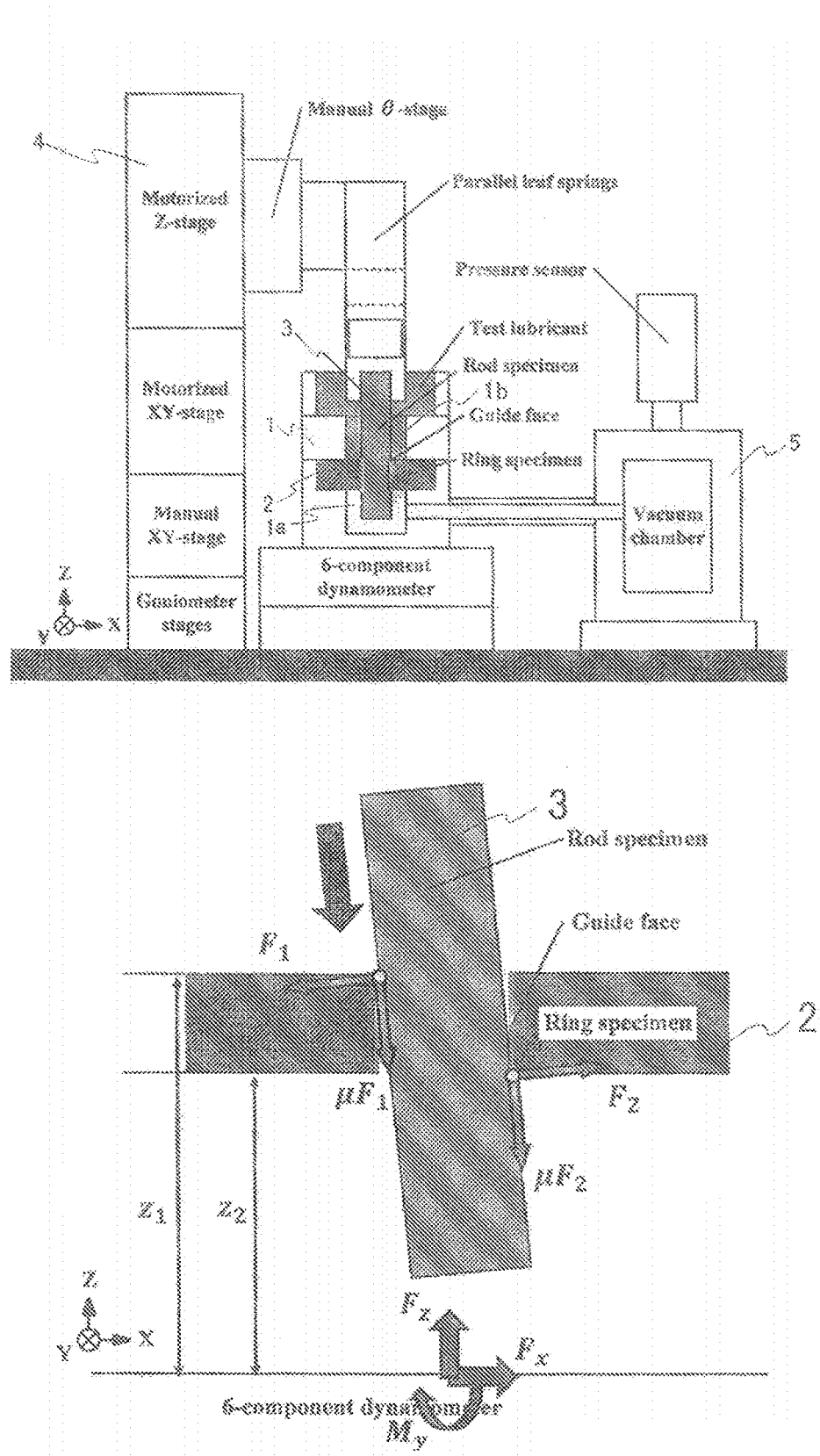

[FIG. 2]
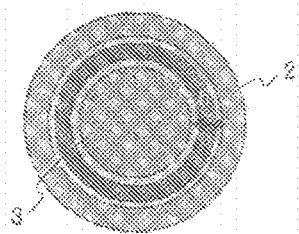
[FIG. 3]
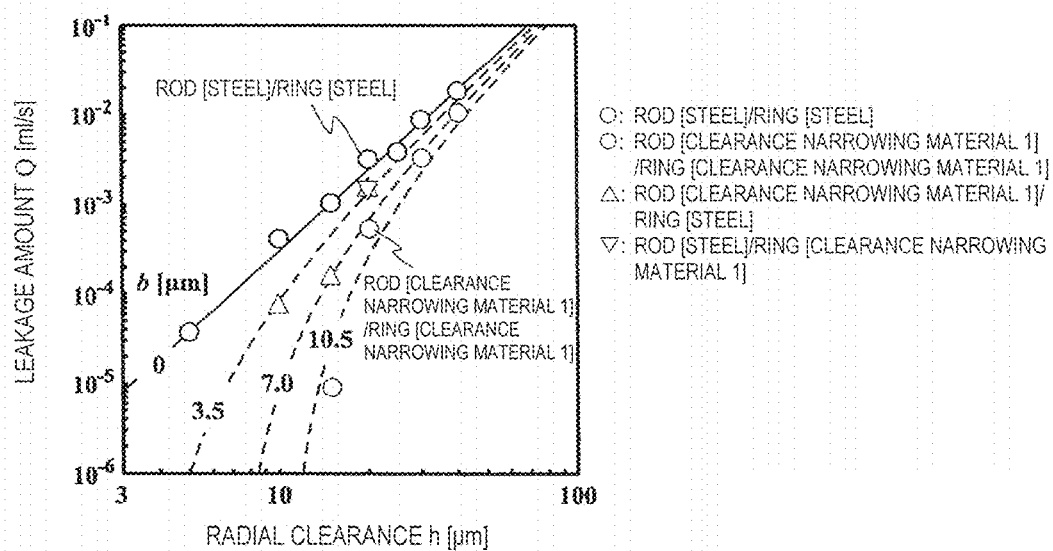
[FIG. 4]
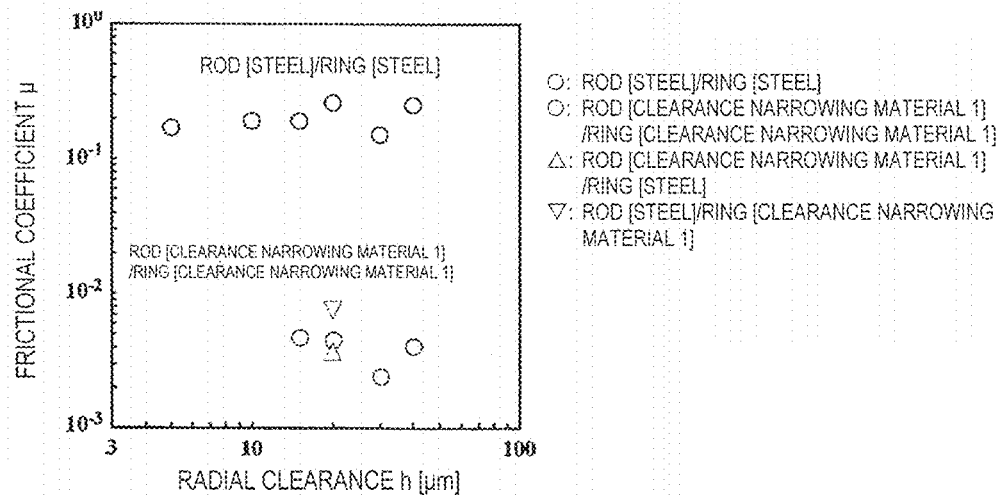

[FIG. 5]
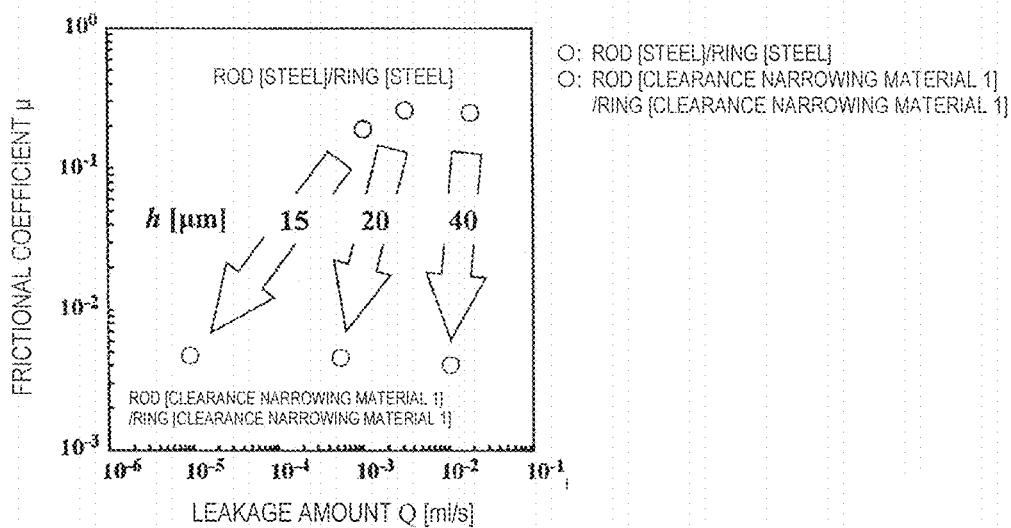
[FIG. 6]
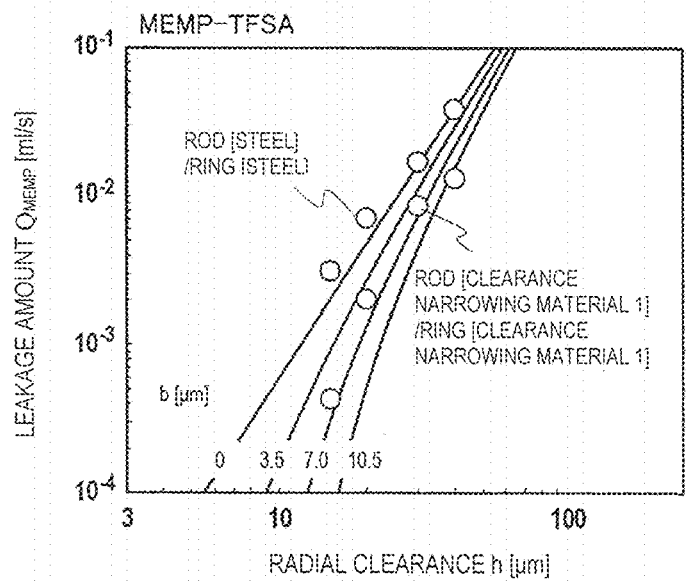

[FIG. 7]
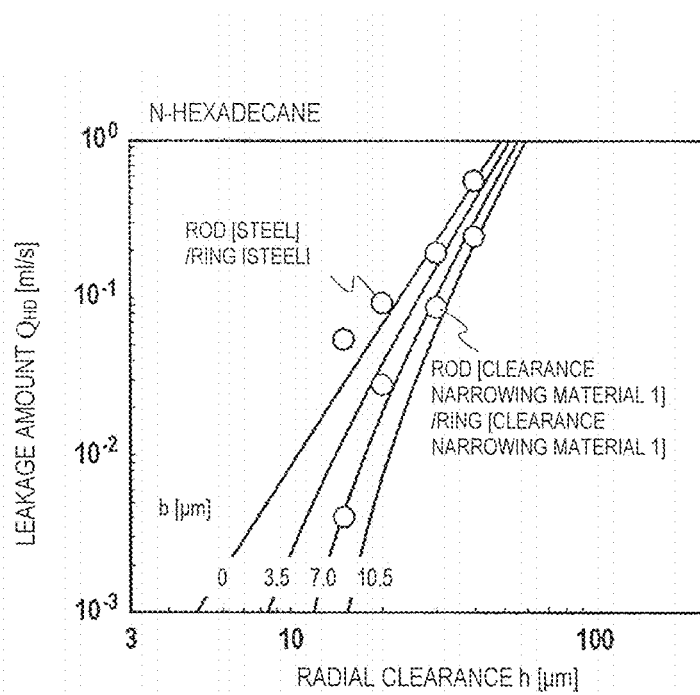
[FIG. 8]
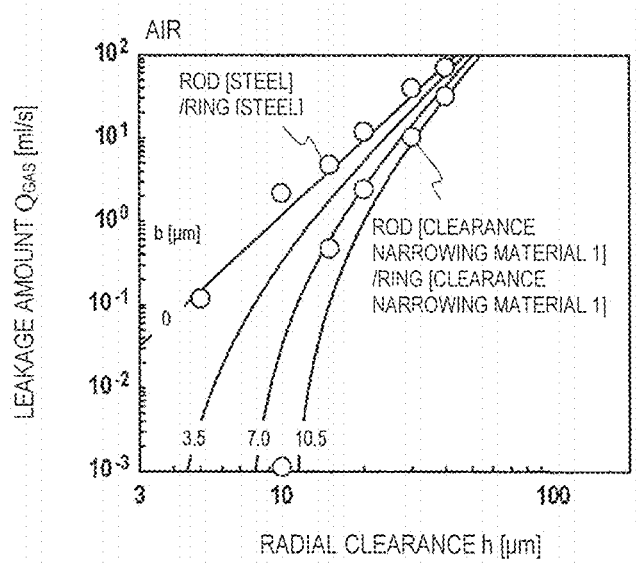

[FIG. 9]
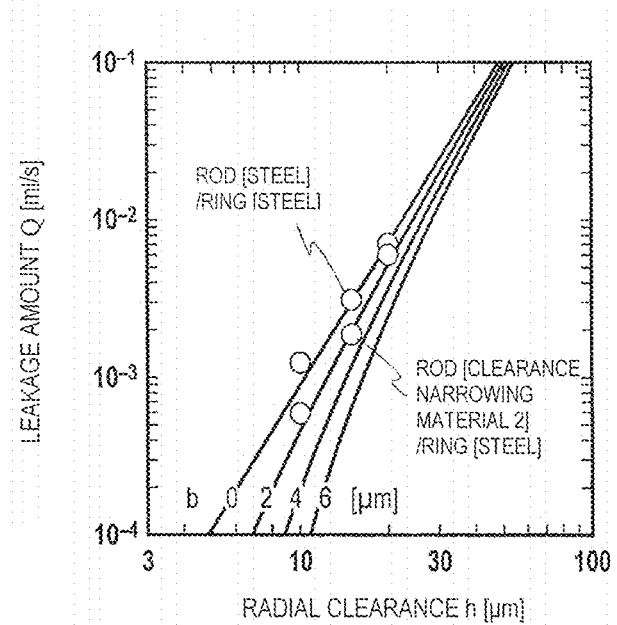

CLEARANCE NARROWING MATERIAL, CLEARANCE NARROWING MATERIAL COMPOSITE, AND ARTICLE USING SAME

TECHNICAL FIELD

The present invention relates to a clearance narrowing material, a clearance narrowing material composite, and an article using them.

BACKGROUND ART

For example, a fitting member structure formed by fitting a pair of members each having a fittable shape into each other, such as a structure formed of a fitting hole and a shaft inserted into the fitting hole exists in various devices, and the pair of members thereof support each other to keep the positional relation between the pair of members themselves or between the member and any other member, or one member moves relatively to the other member to contribute toward the mechanical motion of devices. Here, in some of such fitting member structures, the clearance between the pair of members that fit into each other is required to be sealed up against liquid or vapor, and in particular, in the case where one part moves relatively to the other member, the clearance sealing performance is required to be secured without obstructing the relative movement. To satisfy such requirements, various sealing mechanisms for sealing up a clearance between a pair of members of a fitting member structure have been developed.

For example, a mechanical device that deals with a fluid such as a pump, a stirrer and a compressor has a shaft that transmits the power of a drive part to machine parts in a housing. The shaft is inserted into a fitting hole formed in the housing, and moves rotationally or reciprocates axially in the fitting hole, owing to the power from the drive part. In a fitting member structure composed of such a fitting hole and a shaft, a liquid inside the housing therearound is required to be prevented from leaking out without obstructing the movement of the shaft, and as a member for the purpose, a mechanical seal formed by combining multiple members such as a securing ring and a rotating ring is used.

However, a mechanical sealing mechanism such as a mechanical seal has a complicated structure and therefore the component members thereof are difficult to adjust, and for example, there may often occur problems that the rotating ring mounted on a shaft is inclined relative to the securing ring mounted on a housing and therefore a sufficient sealing performance could not be realized, or a shaft movement could not be in order. In addition, there are other problems that such a mechanical sealing mechanism is required to be periodically detached and exchanged, and takes a lot of trouble for the operation, and the maintenance cost is great.

Given the situation, a technique has been taken into consideration that a film having a relatively low frictional coefficient is formed between the opposing faces of a pair of members constituting a fitting member structure to thereby narrow the clearance between the pair of members to secure a sealing performance against a fluid to run therethrough. With such a film, mechanical adjustment by a mechanical seal may be omitted, and in addition, maintenance may not be required by enhancing the durability through selection of film materials and, as the case may be, inexpensive film materials can be used to suppress maintenance costs. As such a film having a low frictional coefficient, for example, a film of hard DLC (diamond like carbon) and a film formed by coating with a self-lubricative resin such as polyoxymethylene are taken into consideration.

However, a hard material such as DLC is not flexible and therefore could hardly absorb a dimensional error, and in order to seal up a clearance with such a film, a pair of members are required to have a high dimensional accuracy and a high mechanical accuracy. As a result, there may rather occur an inconvenience of cost increase. On the other hand the film formed by coating with a resin has some advantages that the resin is relatively inexpensive and can absorb a dimensional error owing to the flexibility of the film and therefore the dimensional accuracy and the mechanical accuracy of the fitting members can be relatively low. However, such a resin coating film is at any cost poor in wear resistance, and especially in the case where the film is used for sliding members under the condition with no back clearance in such a clearance between fitting members, there may occur a problem that the film would receive a strong force generated in the clearance to be thereby seriously damaged to lose the function as a sealing member.

As mentioned above, for enhancing the sealing penton ante in a clearance in a fitting member structure, arranging a sealing member such as a film in the clearance to thereby enhance the sealing performance therein is considered to be better than use of a mechanical sealing mechanism such as a mechanical seal. However, a sealing member to be arranged in a clearance of a fitting member structure is required to have an excellent sealing performance and have mechanical characteristics resistant to sliding without obstructing relative movement of a pair of members and while receiving a strong force, but in fact, heretofore, a sealing member capable of satisfying such requirements has not as yet found out.

Given the situation, the present inventors have specifically noted a polymer brush formed through immobilization of a polymer chain on the surface of a substrate at a high density through living radical polymerization. Such a polymer brush is known to exhibit low friction properties and good lubricity, and a slide mechanism using such characteristics has been proposed (for example, see PTLs 1 to 3). However, the other characteristics are not as yet sufficiently understood, and use of such a polymer blush has been limited.

CITATION LIST

Patent Literature

PTL 1: Japanese Patent 3422463 (JP-11-263819A)
PTL 2: JP-2006-316169A
PTL 3: JP-2014-169787A

SUMMARY OF INVENTION

Technical Problem

As opposed to the above, the present inventors have made investigations from various aspects about the performance of a polymer brush, and have found that, when a polymer brush is arranged in a clearance of a fitting member structure and a liquid is infiltrated thereinto, then the polymer brush is greatly swollen to narrow the space of the clearance to thereby effectively prevent fluid leakage through the clearance. The above-mentioned patent publications describe low friction properties and good lubricity of a polymer brush but do not describe the effect thereof to prevent fluid leakage, and from these publications, anyone could not anticipate an effect of a polymer brush for preventing fluid leakage.

Accordingly, the present inventors have made further investigations about usefulness of a polymer brush and a polymer material having a common structure with such a polymer brush, and have made further studies for the purpose of finding out a material capable of effectively improving a sealing performance against a fluid in a clearance without obstructing a relative movement of members constituting a clearance, and further for providing an article capable of preventing fluid leakage through a clearance and enabling smooth movement of members that form a clearance.

Solution to Problem

As a result of assiduous studies made for the purpose of solving the above-mentioned problems, the present inventors have found that a brush-shaped polymer chain aggregate formed of multiple polymer chains immobilized on a substrate has an excellent property as a clearance narrowing material. With that, the inventors have further found that when the polymer chain aggregate is arranged on the opposing surfaces of a pair of members that form a clearance, then it effectively prevents fluid leakage through the clearance, and additionally have found that, when one member that forms the clearance is moved relatively to the other member, then smooth movement can be realized. The present invention has been proposed on the basis of these findings, and specifically has the following constitution.

[1] clearance narrowing material containing a brush-shaped polymer chain aggregate formed of multiple polymer chains immobilized on a substrate.
[2] The clearance narrowing material according to [1], wherein the substrate is a carrier.
[3] The clearance narrowing material according to [2], wherein the shape of the substrate is a sheet-like, particulate or fibrous one.
[4] The clearance narrowing material according to [2], wherein the substrate is at least one member of a fitting member structure formed by fitting a pair of members into each other, and the multiple polymer chains are immobilized on at least the face that opposes the other member of the pair of members, among the surfaces of the one member.
[5] The clearance narrowing material according to any one of [2] to [4], wherein the density of the polymer chains is 0.02 chain/nm$^2$ or more.
[6] The clearance narrowing material according to [1], wherein the substrate is a polymer chain, and the multiple polymer chains bond to the polymer chain of the substrate, as side chains thereto.
[7] The clearance narrowing material according to [6], wherein the polymer chain of the substrate and the polymer chain aggregate of multiple polymer chains form a bottle brush-shaped structure.
[8] The clearance narrowing material according to any one of [1] to [7], wherein the surface occupancy of the polymer chains is 5% or more.
[9] The clearance narrowing material according to any one of [1] to [8], wherein the polymer chain aggregate is impregnated and swollen with a liquid substance.
[10] The clearance narrowing material according to any one of [1] to [8], wherein the thickness of the swollen polymer chain aggregate is 1.5 times or more of the dry thickness of the polymer chain aggregate.
[11] The clearance narrowing material according to any of [1] to [10], which has a compressive elasticity modulus of 1 MPa or more and a frictional coefficient ($\mu$) of 0.1 or less.
[12] The clearance narrowing material according to any of [1] to [11], which has an indentation depth of 100 nm or more and a compressive elasticity modulus of 1 MPa or more.
[13] A clearance narrowing material composite having a clearance narrowing material according to any one of [1] to [12] and a substrate with the clearance narrowing material immobilized thereon.
[14] The clearance narrowing material composite according to [13], wherein the substrate is a sheet, a granulate material, a fibrous material, or at least one member of a fitting member structure formed of a pair of members fitting into each other.
[15] An article having a pair of members arranged to face each other and having a clearance between the opposing faces of the pair of members, wherein:
a clearance narrowing material according to any one of [1] to [12] is immobilized on at least one of the opposing faces of the pair of members.
[16] The article according to [15], wherein the pair of members are a fitting member structure.
[17] The article according to [15] or [16], wherein the width of the clearance is 15 μm or less.
[18] The article according to any one of [15] to [17], wherein the ratio of the e thickness b in the following equation (4) to the total width of the clearance is 20% or more.

$$Q = a(h-b)^3 \quad (4)$$

wherein h represents a radial clearance (μm); Q represents an amount (mL) of a liquid leaking from the clearance when the clearance narrowing material is immobilized on the surface of a member that forms the clearance and then a liquid is put on an opening of the clearance; a represents a coefficient (mL/sec·μm$^3$) to be defined from experimental conditions (differential pressure in clearance, liquid viscosity, clearance length, clearance outer diameter); and b represents an effective thickness of the clearance narrowing material in the clearance.

Advantageous Effects of Invention

Using the clearance narrowing material of the present invention, a space of a clearance can be narrowed and fluid leakage through a clearance can be thereby effectively prevented and, in addition, when one member that forms a clearance is moved relatively to the other member of the clearance, a smooth movement can be realized. Also using the clearance narrowing material, an article capable of preventing fluid leakage through a clearance and enabling smooth movement of a member that forms a clearance can be realized.

BRIEF DESCRIPTION OF DRAWINGS

FIG. 1 This is a schematic view of a narrow clearance model tester.

FIG. 2 This is a schematic cross-sectional view showing a radial clearance h of a narrow clearance model tester shown in FIG. 1.

FIG. 3 This is a graph showing a relationship between a radial clearance h and an ionic liquid, N,N-diethyl-N-methyl-N-(2-methoxyethyl)ammonium-bis(trifluoromethanesulfonyl)-imide (DEME-TFSI), in a system where a clearance narrowing material 1 has been imparted to at least one of a rod and a ring, and a system where a clearance narrowing material is not imparted to a rod and a ring.

FIG. 4 This is a graph showing a relationship between a radial clearance h and a frictional coefficient (μ) between a rod and a ring, in a system where a clearance narrowing material 1 has been imparted to at least one of a rod and a ring and a system where a clearance narrowing material is not imparted to a rod and a ring.

FIG. 5 This is a graph showing a relationship between a leakage amount of an ionic liquid DEME-TFSI and a frictional coefficient, in a system where a clearance narrowing material 1 has been imparted to both a rod and a ring, and a system where a clearance narrowing material is not imparted to a rod and a ring.

FIG. 6 This is a graph showing a relationship between a radial clearance h and a leakage amount of an ionic liquid MEMP-TFSI, in a system where a clearance narrowing material 1 has been imparted to both a rod and a ring, and a system where a clearance narrowing material is not imparted to a rod and a ring.

FIG. 7 This is a graph showing a relationship between a radial clearance h and a leakage amount of n-hexadecane, in a system where a clearance narrowing material 1 has been imparted to both a rod and a ring, and a system where a clearance narrowing material is not imparted to a rod and a ring.

FIG. 8 This is a graph showing a relationship between a radial clearance h and a leakage amount of air, in a system where a clearance narrowing material 1 has been imparted to both a rod and a ring, and a system where a clearance narrowing material is not imparted to a rod and a ring.

FIG. 9 This is a graph showing a relationship between a radial clearance h and a leakage amount of an ionic liquid MEMP-TFSI, in a system where a clearance narrowing material 2 has been imparted to a rod alone of a rod and a ring, and a system where a clearance narrowing material is not imparted to a rod and a ring.

DESCRIPTION OF EMBODIMENTS

The invention is described in detail hereinunder. The description of the constitutive elements of the invention given hereinunder is for some typical embodiments or specific examples of the invention, to which, however, the invention should not be limited to such embodiments. In this description, the numerical range expressed by the wording "to" means the range that falls between the former number indicating the lower limit of the range and the latter number indicating the upper limit thereof. "(Meth)acrylic acid" means both acrylic acid and methacrylic acid.

<Clearance Narrowing Material>

The clearance narrowing material of the present invention contains a brush-shaped polymer chain aggregate formed of multiple polymer chains immobilized on a substrate.

The "clearance narrowing material" in the present invention means a material to be immobilized on the surface of a member that forms a clearance to thereby exhibit a function of narrowing a space of the clearance and increasing the sealing performance against a fluid of the clearance. Here, narrowing a clearance includes both narrowing of a space of a clearance owing to existence of a clearance narrowing material in the space and complete filling of a space of a clearance with a clearance narrowing material. "Sealing performance" means a performance of preventing leakage of a fluid through a clearance to the other end when a fluid is applied to the above of one opening of a clearance. "Fluid" is a liquid or a vapor, and the clearance narrowing material of the present invention may enhance a sealing performance against any one of a liquid and a vapor or may enhance a sealing performance against both a liquid and a vapor.

The polymer chain aggregate for use in the present invention is a tribology system material that forms a brush-like shape as a whole and is provided with softness of a polymer chain and a resilience derived from ultralow friction properties (hereinafter this may be referred to as "SRT material"), and quite differs from an organic film formed by mere coating with a polymer solution.

And further, when the polymer chain aggregate is impregnated with a liquid substance, each polymer chain therein swells and forms a low-friction layer having a large indentation depth and a large compressive elasticity modulus. Consequently, when the polymer chain aggregate is impregnated with a liquid substance and is arranged in a clearance, then a space of the clearance is narrowed to thereby effectively enhance the sealing performance against a fluid of the clearance. In addition, a layer of the polymer chain aggregate has a large indentation depth and a large compressive elasticity modulus, and therefore, even when the dimensional accuracy and the mechanical accuracy of the members constituting a clearance are low, the layer can absorb the error to effectively narrow the space of the clearance. Furthermore, a layer of the polymer chain aggregate has low friction properties and has a lubricity, and therefore even in a case of relative movement of one member constituting a clearance to the other member, the layer can actually contribute toward realizing smooth movement without obstructing the relative movement. Further, in a layer of the polymer chain aggregate, each polymer chain is individually immobilized on a substrate, and therefore even in the case where relative movement of the members constituting a clearance is repeated, the layer is hardly worn and can exhibit excellent durability. Consequently, the polymer chain aggregate can be effectively used as a clearance narrowing material.

In the following, the polymer chain aggregate that the clearance narrowing material of the present invention contains is described.

[Polymer Chain Aggregate]

The polymer chain aggregate is formed of multiple polymer chains immobilized on a substrate, and forms a brush-like shape as a whole.

The "polymer chain" in the present invention means a molecule or a molecular part having a structure of multiple constituent units linearly connected to each other. Multiple polymer chains that constitute the polymer chain aggregate may be the same as or different from each other. The polymer chain may have a side chain or a branched structure or may have a crosslinked structure between the polymer chains or between the polymer chain and a substrate, so far as it has a structure of multiple constituent units linearly connected to each other.

(Polymer Chain)

The polymer chain to form the polymer chain aggregate may be a non-electrolyte polymer or an electrolyte polymer, and may be a hydrophobic polymer or a hydrophilic polymer.

As the non-electrolyte polymer, poly(methyl methacrylate) (PMMA) is preferred; and as the electrolyte polymer, poly(sodium sulfonated glycidyl methacrylate) (PSGMA) and an ionic liquid polymer are preferred.

As the hydrophobic polymer, a poly(alkyl (meth)acrylate) such as poly methylmethacrylate) is preferred.

As the hydrophilic polymer, a poly(hydroxyalkyl (meth)acrylate) such as poly(2-hydroxyethyl methacrylate) (PHEMA), or a poly(meth)acrylate having a polyethylene glycol side chain is preferred. The hydrophilic polymer may be prepared using a hydrophilic monomer, or may be prepared by introducing a hydrophilic group into a polymer prepared using a hydrophobic monomer.

The polymer chain may be a homopolymer formed through polymerization of one kind of monomer or may be a copolymer formed through copolymerization of two or more kinds of monomers. The copolymer includes a random, copolymer, a block copolymer, and a gradient copolymer.

Preferably, the monomer for use in polymer chain formation is one capable of forming the polymer chain formed through polymerization on a substrate as a grafting chain. The monomer of the type includes a monomer having at least one addition-polymerizable double bond, and is preferably a monofunctional monomer having one addition-polymerizable double bond. The monofunctional monomer having one addition-polymerizable double bond includes a (meth)acrylic monomer and a styrenic monomer.

Specific examples of the (meth)acrylic monomer usable for polymer chain formation are shown below.

As the (meth acrylic monomer, preferred are (meth) acrylic acid, methyl (meth)acrylate, ethyl (meth)acrylate, propyl (meth)acrylate, isopropyl (meth)acrylate, butyl (meth)acrylate, isobutyl (meth)acrylate, tert-butyl (meth) acrylate, pentyl (meth))acrylate, hexyl (meth)acrylate, and cyclohexyl (meth)acrylate.

As the (meth)acrylic monomer, also preferred are heptyl (meth)acrylate, octyl (meth)acrylate, 2-ethylhexyl, (meth) acrylate, nonyl (meth)acrylate, decyl (meth)acrylate, dodecyl (meth)acrylate, phenyl (meth)acrylate, toluyl (meth)acrylate, and benzyl (meth)acrylate.

As the (meth)acrylic monomer, also preferred are 2-methoxyethyl (meth)acrylate, 3-methoxypropyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, and 3-ethyl-3-(meth)acryloyloxymethyloxetane.

As the (meth)acrylic monomer, also preferred are 2-(meth)acryloyloxyethyl isocyanate, 2-aminoethyl (meth) acrylate, 2-(2-bromopropionyloxy)ethyl (meth)acrylate, and 2-(2-bromoisobutyryloxy)ethyl (meth)acrylate.

As the (meth)acrylic monomer, also preferred are 1-(meth)acryloxy-2-phenyl-2-(2,2,6,6-tetramethyl-1-piperidinyloxy)ethane, 1-(4-((4-(meth)acryloxy)ethoxyethyl) phenylethoxy)piperidine, and γ-(methacryloyloxypropyl) trimethexysilane.

As the (meth)acrylic monomer, also preferred are 3-(3,5,7,9,11,13,15-heptaethylpentacyclo[9,5.1.13,9.15,15.17,13]octasiloxane-1-yl)-propyl(meth)acrylate, 3-(3,5,7,9,11,13,15-heptaisobutyl-pentacyclo[9.5,1.13,9.15.15,17,13]octasiloxane-1-yl)-propyl(meth)acrylate, and 3-(3,5,7,9,11,13,15-heptaisooctylpentacyclo[9,5.1,13,9.15,15,17,13]octasiloxane-1-yl)-propyl(meth)acrylate.

As the (meth)acrylic monomer, also preferred are 3-(3,5,7,9,11,13,15-heptacyclopentylpentacyclo[9.5.1.13,9.15,15.17,13]octasiloxane-1-yl)propyl(meth)acrylate, 3-(3,5,7,9,11,13,15-heptaphenylpentacyclo[9.5,1.13,9,15,15,17,13]octasiloxane-1-yl)-propyl (meth)acrylate, and 3-[(3,5,7,9,11,13,15-heptaethylpentacyclo[9.5.1,13,9,1.5,15.17,13]octasiloxane-1-yloxy) dimethylsilyl]propyl (meth)acrylate.

As the (meth)acrylic monomer, also preferred are 3-[(3,5,7,9,11,13,15-heptaisobutylpentacyclo[9,5.1.13,9.15,15.17,13]octasilaxane-1-yl-oxy)dimethylsilylipropyl (meth) acrylate, and 3-[(3,5,7,9,11,13,15-heptaisooctylpentacyclo [9.5.1.13,9.15,15,17,13]octasiloxane-1-yl-oxy) dimethylsilyl]propyl (meth)acrylate.

As the (meth)acrylic monomer, also preferred are 3-[(3,5,7,9,11,13,15-heptacyclopentylpentacyclo[9,5.1.13,9.15, 15.17,13]octasiloxane-1-yloxy)dimethylsilyl]propyl (meth) acrylate, and 3-[(3,5,7,9,11,13,15-pentaphenylpentacyclo [9.5,1.13,9.15,15,1713]octasiloxane-1-yl-oxy) dimethylsilyl]propyl (meth)acrylate.

As the (meth)acrylic monomer, also preferred are (meth) acrylic acid ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, trifluoromethyl (meth)acrylate, and diperfluoromethyl methyl (meth)acrylate.

As the (meth)acrylic monomer, also preferred are 2-perfluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate.

Next, specific examples of the styrenic monomer for use for polymer chain formation are shown below.

As the styrenic monomer, preferred are styrene, vinyltoluene, α-methylstyrene, p-chlorostyrene, p-chloromethylstyrene, m-chloromethylstyrene, o-aminostyrene, p-styrenechlorosulfonic acid, styrenesulfonic acid and its salts, vinylphenylmethyl dithiocarbamate, 2-(2-bromopropionyloxy)styrene, and 2-(2-bromoisobutyryloxy)styrene.

As the styrenic monomer, also preferred are 1-(2-((4-vinylphenyl)methoxy)-1-phenylethoxy)-2,2,6,6-tetramethylpiperidine, 1-(4-vinylphenyl)-3,5,7,9,11,13,15-heptaethylpentacyclo[9.5.1,13,9.15,15.17,13]-octasiloxane, and 1-(4-vinylphenyl)-3,5,7,9,11,13,15-heptaisobutylpentacyclo [9.5.1.13,9,15,15.17,13]-octasiloxane.

As the styrenic monomer, also preferred are 1-(4-vinylphenyl)-3,5,7,9,11,13,15-heptaisooctylpentacyclo [9.5.1.13,9.15,15.17,13]-octasiloxane, 1-(4-vinylphenyl)-3,5,7,9,11,13,15-cyclopentylpentacyclo[9.5.1.13,9.1.5,15.17,13] octasiloxane, and 1-(4-vinylphenyl)-3,5,7,9,11,13,15-heptaphenylpentacyclo[9.5.1.13,9.15,15.17,13]-octasiloxane.

As the styrenic monomer, also preferred are 3-(3,5,7,9,11,13,15-heptaethylpentacyclo[9.5.1.13,9.15,15.17,13]octasiloxane-1-yl)-ethylstyrene, 3-(3,5,7,9,11,13,15-heptaisobutylpentacyclo[9.5.1.13,9.15,15.17,13]octasiloxane-1-yl)-ethylstyrene, and 3-(3,5,7,9,11,13,15-heptaisooctylpentacyclo[9.5.1.13,9,15,15.17,13] octasiloxane-1-yl)-ethylstyrene.

As the styrenic monomer, also preferred are 3-(3,5,7,9,11,13,15-heptacyclopentylpentacyclo[9.5.1.13,9.15,15.17, 13]octasiloxane-1-yl)ethylstyrene, 3-(3,5,7,9,11,13,15-heptaphenylpentacyclo[9.5.1.13,9.15,15.17,13]octasiloxane-1-yl)-ethylstyrene, and 3-((3,5,7,9,11,13,15-heptaethylpentacyclo[9.5.1.13,9.15,15.17,13]octasiloxane-1-yloxy) dimethylsilyl)ethylstyrene.

As the styrenic monomer, also preferred are 3-((3,5,7,9,11,13,15-heptaisobutylpentacyclo[9.5.1.13,9,15,15.17,13] octasiloxane-1-yl-oxy)dimethylsilyl)ethylstyrene, and 3-((3,5,7,9,11,13,15-heptaisooctylpentacyclo[9.5.1.13,9.15, 15.17,13]octasiloxane-1-yl-oxy)dimethylsilyl)ethylstyrene.

As the styrenic monomer, also preferred are 3-((3,5,7,9,11,13,15-heptacyclopentylpentacyclo[9.5.1.13,9,15,15.17, 13]octasiloxane-1-yloxy)dimethylsilyl)ethylstyrene, and 3-((3,5,7,9,11,13,15-heptaphenylpentacyclo[9.5.1.13,9.15, 15.17,13]octasiloxane-1-yl-oxy)dimethylsilyl)ethylstyrene.

Also for polymer chain formation, a monofunctional monomer having one addition-polymerizable double bond exemplified below can be used.

As the monofunctional monomer having one addition-polymerizable double bond, preferred are fluorine-containing vinyl monomers (e.g., perfluoroethylene, perfluoropropylene, vinylidene fluoride), silicon-containing vinyl monomers (e.g., vinyltrimethoxysilane, vinyltriethoxysilane), maleic anhydride, maleic acid, maleic monoalkyl esters and dialkyl esters, fumaric acid, and fumaric monoalkyl esters and dialkyl esters.

As the monofunctional monomer having one addition-polymerizable double bond, also preferred are maleimide monomers (e.g., maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide).

As the monofunctional monomer having one addition-polymerizable double bond, also preferred are nitrile group-containing monomers (e.g., acrylonitrile, methacrylonitrile), amide group-containing monomers (e.g., acrylamide, methacrylamide), and vinyl ester monomers (e.g., vinyl acetate, vinyl propionate, vinyl pivalate, vinyl benzoate, vinyl cinnamate).

As the monofunctional monomer having one addition-polymerizable double bond, also preferred are olefins (e.g., ethylene, propylene), conjugated dienic monomers (e.g., butadiene, isoprene), vinyl halides (e.g., vinyl chloride), vinylidene halides (e.g., vinylidene chloride), and allyl halides (e.g., allyl chloride).

As the monofunctional monomer having one addition-polymerizable double bond, also preferred are allyl alcohol, vinylpyrrolidone, vinylpyridine, N-vinylcarbazole, methyl vinyl ketone, and vinyl isocyanate.

Further, also preferred are macromonomers having one polymerizable double bond in one molecule, in which the main chain is derived from styrene, (meth)acrylates or siloxane.

For polymer chain formation, in addition, a hydrophobic monomer and a hydrophilic monomer are especially preferably used.

As the hydrophobic monomer, preferred are acrylates (e.g., alkyl acrylates such as methyl acrylate, ethyl acrylate, propyl acrylate, butyl acrylate, cyclohexyl acrylate, and hexafluoroisopropyl acrylate; aryl acrylates such as phenyl acrylate; arylalkyl acrylates such as benzyl acrylate; and alkoxyalkyl acrylates such as methoxymethyl acrylate).

As the hydrophobic monomer, also preferred are methacrylates (e.g., alkyl methacrylates such as methyl methacrylate, ethyl methacrylate, propyl methacrylate, butyl methacrylate, cyclohexyl methacrylate, hexafluoroisopropyl methacrylate; aryl methacrylates such as phenyl methacrylate; arylalkyl methacrylates such as benzyl methacrylate; and alkoxyalkyl methacrylates such as methoxymethyl methacrylate).

As the hydrophobic monomer, also preferred are fumarates (e.g., alkyl fumarates such as dimethyl fumarate, diethyl fumarate, diallyl fumarate), and maleates (e.g., alkyl maleates such as dimethyl maleate, diethyl maleate, diallyl maleate).

As the hydrophobic monomer, also preferred are itaconates (e.g., alkyl itaconates), crotonates (e.g., alkyl crotonates), methyl vinyl ether, ethoxyethyl vinyl ether, vinyl acetate, vinyl propionate, vinyl benzoate and styrene.

As the hydrophobic monomer, also preferred are alkylstyrene, vinyl chloride, vinyl methyl ketone, vinyl stearate, vinyl alkyl ether, and mixtures thereof.

As the hydrophilic monomer, preferred are hydroxy-substituted alkyl acrylates (e.g., 2-hydroxyethyl acrylate, 2-hydroxypropyl acrylate, 2-hydroxypropyl acrylate, 2,3-dihydroxypropyl acrylate, polyethoxyethyl acrylate, polyethoxypropyl acrylate).

As the hydrophilic monomer, also preferred are hydroxy-substituted alkyl methacrylates (e.g., 2-hydroxyethyl methacrylate, 2-hydroxypropyl methacrylate, 2-hydroxy-propyl methacrylate, 2,3-dihydroxypropyl methacrylate, polyethoxyethyl methacrylate, polyethoxypropyl methacrylate).

As the hydrophilic monomer, also preferred are acrylamide, N-alkylacrylamides (e.g., N-methylacrylamide, N,N-dimethylacrylamide), and N-alkylmethacrylamides (e.g., N-methylmethacrylamide).

As the hydrophilic monomer, also preferred are polyethylene glycol monoacrylate, polyethylene glycol monomethacrylate, alkoxypolyethylene glycol acrylate, alkoxypolyethylene glycol methacrylate, phenoxypolyethylene glycol acrylate, phenoxypolyethylene glycol methacrylate, and 2-glucosiloxyethyl methacrylate.

As the hydrophilic monomer, also preferred are acrylic acid, methacrylic acid, fumaric acid, maleic acid, itaconic acid, crotonic acid, methacrylamide, allyl alcohol, N-vinylpyrrolidone and N,N-dimethylaminoethyl acrylate, and mixtures thereof.

A monomer having a specific group in the side chain is also favorably used for polymer chain formation. For example, a monomer having a group capable of being readily converted into a carboxyl group or a carboxylate group in the side chain thereof is preferred in that, after formed into a polymer, the side chain of the resultant polymer may be converted into a carboxyl group or a carboxylate group to give hydrophilicity to the polymer.

As the monomer having a group capable of being readily converted into a carboxyl group or a carboxylate group in the side chain thereof, for example, preferred are 1-methoxyethyl acrylate, 1-ethoxyethyl acrylate, 1-propoxyethyl acrylate, 1-(1-methylethoxy)ethyl acrylate, 1-butoxyethyl acrylate, 1-(2-methylpropoxy)ethyl acrylate, and 1-(2-ethylhexoxy)ethyl acrylate.

As the monomer having a group capable of being readily converted into a carboxyl group or a carboxylate group in the side chain thereof, also preferred are pyranyl acrylate, 1-methoxyethyl methacrylate, 1-ethoxyethyl methacrylate, 1-propoxyethyl methacrylate, 1-(1-methylethoxy)ethyl methacrylate, 1-butoxyethyl methacrylate, 1-(2-methylpropoxy)ethyl methacrylate, and 1-(2-ethylhexoxy)ethyl methacrylate.

As the monomer having a group capable of being readily converted into a carboxyl group or a carboxylate group in the side chain thereof, also preferred are pyranyl methacrylate, di-1-methoxyethyl maleate, di-1-ethoxyethyl maleate, di-1-propoxyethyl maleate, di-1-(1-methylethoxy)ethyl maleate, di-1-butoxyethyl maleate, di-1-(2-methylpropoxy) ethyl maleate, and dipyranyl maleate.

One alone or two or more kinds of the above monomers may be used for polymer chain formation, either singly or as combined.

As described above, the polymer chain may also be a hydrolyte polymer such as an ionic liquid polymer.

Examples of the ionic liquid polymer include, though not specifically limited thereto, polymers produced through polymerization of a compound represented by the following general formula (1).

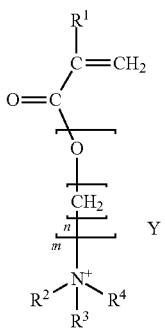

(1)

In the general formula (1), in represents an integer of 1 or more and 10 or less, and n represents an integer of 1 or more and 5 or less.

$R^1$ represents a hydrogen atom, or an alkyl group having 1 to 3 carbon atoms $R^2$, $R^3$ and $R^4$ each represent an alkyl group having 1 to 5 carbon atoms. The alkyl group of $R^2$, $R^3$ and $R^4$ may be substituted with one or more hetero atoms selected from an oxygen atom, a sulfur atom and a fluorine atom, at the carbon atom and a hydrogen atom therein, and two or more of $R^2$, $R^3$ and $R^4$ may bond to each other to form a cyclic structure.

Y represents a monovalent anion. The monovalent anion Y includes, though not specifically limited thereto, $BF_4^-$, $PF_6^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$, and $I^-$. In consideration of the stability thereof, the anion Y is preferably $BF_4^-$, $PF_6^-$, $(CF_3SO_2)_2N^-$, $CF_3SO_3^-$, or $CF_3CO_2^-$.

Preferably, the ionic liquid polymer is a polymer produced through polymerization of a compound of any of the following general formulae. (2) to (9) among the compounds represented by the general formula (1).

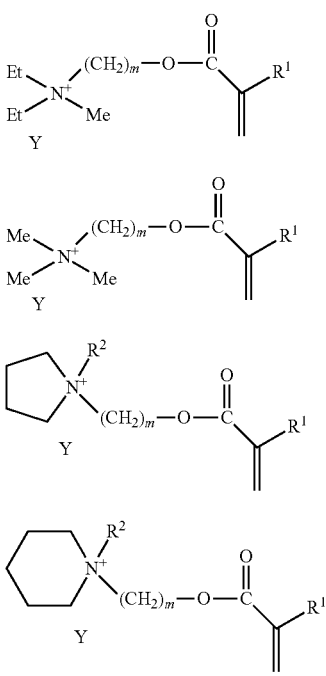

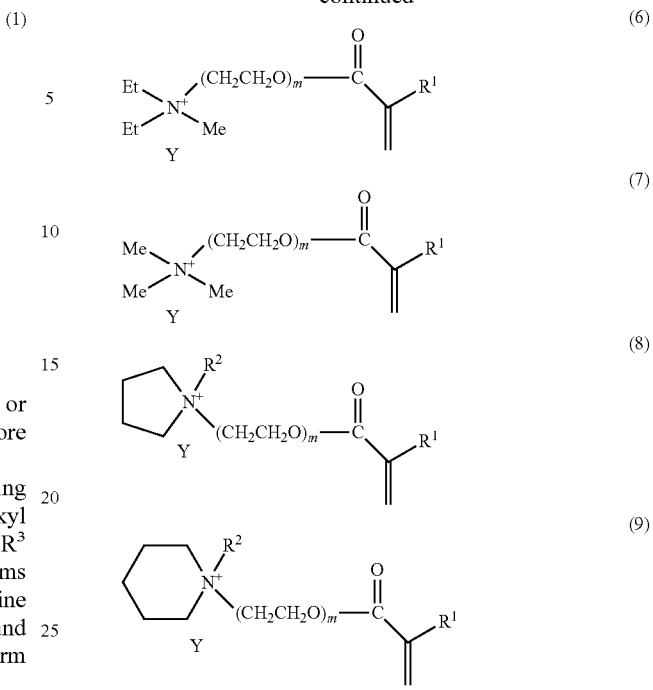

In the general formulae (2) to (9), m, $R^1$, $R^2$, and Y have the same meanings as in, $R^1$, $R^2$, and Y in the general formula (1). Mc represents a methyl group, and Et represents an ethyl group.

(Crosslinked Structure)

The polymer chain aggregate may have a crosslinked structure formed between the polymer chains therein or between the polymer chain and a substrate. With that, the elastic modulus of the polymer chain aggregate can be controlled.

The crosslinked structure to be formed between polymer chains may be a physical crosslinked structure or a chemical crosslinked structure. The crosslinked structure may be formed simultaneously with the polymerization reaction to form polymer chains, or nay be formed after formation of polymer chains. For forming a crosslinked structure simultaneously with the polymerization reaction to form polymer chains, an appropriate amount of a bifunctional monomer such as a divinyl monomer, e.g., ethylene glycol dimethacrylate may be added to the polymerization reaction liquid in addition to the naonofunctional monomer for forming polymer chains thereto. For forming a crosslinked structure between the formed polymer chains or between the polymer chain and a substrate, a crosslinking group is previously introduced into a polymer chain using a crosslinking group-having monomer, and the crosslinking group is reacted with a reactive group of the other polymer chain, or the crosslinking group is reacted with a reactive group of a substrate. The crosslinking group includes an azide group, and a halogen group (preferably a bromine group). A reactive group that remains at the terminal of the graft chain in formation of a polymer chain through living radical polymerization may also be used as a crosslinking group.

As to whether or not a crosslinked structure has been formed sufficiently may be judged depending on the presence or absence of reduction in solubility in a good solvent. For example, a free polymer formed by adding 1 mol % of divinyl monomer to a monofunctional monomer can swell in a good solvent but does not almost dissolve therein. On the other hand, a polymer brash to be mentioned below swells in a good solvent even though crosslinked.

[Formation of Polymer Chain Aggregate]

Polymer chains constituting the polymer chain aggregate are individually immobilized on a substrate. The substrate maybe a carrier formed of a substance different from the polymer chain aggregate, or may be a polymer chain of a main chain to which polymer chains bond as side chains. In the case where the substrate is a carrier, the polymer chain aggregate constitutes a "polymer brush". In the case where the substrate is a polymer chain, a whole of the main chain formed of the polymer chain as combined with polymer chains (side chains) bonding to the main chain constitutes "a polymer having a bottle brush structure".

In the following, a method of forming a polymer chain aggregate is described individually for the polymer brush and for the polymer having a bottle brush structure.

[A] Polymer Brush

The polymer chain aggregate of a polymer brush can be produced according to a graft polymerization method of bonding multiple polymer chains to a substrate as graft chains thereto. The graft polymerization includes a grafting-from method and a grafting-to method, and among these, a grafting-from method is preferred. Here, the grafting-from method is a method of introducing a polymerization initiation group into a substrate and a graft chain is grown from the polymerization initiation group; while the grafting-to method is a method of bonding previously-synthesized graft chains to the reaction points introduced into a substrate.

The polymer chain aggregate can also be produced according to a method of hydrophobic bonding of a hydrophobic part of a polymer having a hydrophobic block and a hydrophilic block (diblock copolymer) to the surface of a hydrophobic substrate or a hydrophobized substrate. One example of the diblock copolymer is a copolymer composed of a hydrophobic block of a polymethyl methacrylate (PMMA) structure and a hydrophilic block of poly(sodium sulfonated glycidyl methacrylate) (PSGMA) structure. Any other polymer structure may exist between the PMMA structure and the PSGMA structure. For details of the method, reference may be made to Nature, 425, 163-165 (2003).

(Graft Polymerization Method)

A method for producing a polymer chain aggregate according to a graft polymerization method is described specifically below.

Polymer Chain Formation

Though not specifically limited thereto, a radical polymerization method is preferably used for formation of a polymer chain for use in a graft polymerization method, more preferably a living radical polymerization (LRP) method, and even more preferably an atom transfer radical polymerization (ATRP) method. The living radial polymerization is advantageous in that molecular weight and molecular weight distribution of polymer chains are easy to control and various types of copolymers (e.g., random copolymers, block copolymers, composition-gradient copolymers) can be formed as graft chains. Also according to the living radical polymerization method, concentrated polymer brushes to be mentioned hereinunder can be formed while accurately controlling the density and the thickness thereof, by employing a high-pressure condition and using an ionic liquid solvent. Here, the graft polymerization method using a living radical polymerization method may be any of a grafting-from method or a grafting-to method, but a grafting-from method is preferred. For details of a graft polymerization method including a living radical polymerization method and a grafting-from method as combined, reference may be made to JP-11-263819A. For details of the atom transfer radical polymerization method, reference may be made to J. Am. Chem. Soc., 117, 5614 (1995); Macromolecules, 28, 7901. (1995); Science, 272, 866 (1996); Macromolecules, 31, 5934-5936 (1998).

In addition, polymer chains may also be formed according to a nitroxide mediated polymerization method (NMP), a reversible addition-fragmentation chain transfer (RAFT) polymerization method, a reversible chain transfer catalyzed polymerization method (RTCP), and a reversible complexation mediated polymerization method (RCMP).

The catalyst for radical polymerization may be any one capable of controlling radical polymerization, and is more preferably a transition metal complex is used.

Preferred examples of the transition metal complex include metal complexes in which the center metal is a Group 7, Group 8, Group 9, Group 10 or Group 11 element of the Periodic Table. Above all, preferred are copper complexes, ruthenium complexes, iron complexes and nickel complexes, and more preferred are copper complexes.

As copper complexes, preferred is a complex of a cuprous compound and an organic ligand. Examples of the cuprous compound include cuprous chloride, cuprous bromide, cuprous iodide, cuprous cyanide, cuprous oxide, and cuprous perchlorate. The organic ligand includes 2,2'-bipyridyl or derivatives thereof, 1,10-phenanthroline or derivatives thereof, polyamines tetramethylethylenediamine, pentamethyldiethylenetriamine, hexamethyltris(2-aminoethyl)amine), and polycyclic alkaloids such as L-(−)-sparteine.

A divalent ruthenium chloride/tristriphenylphosphine complex ($RuCl_2(PPh_3)_3$) is also preferred as the catalyst. In the case where a ruthenium compound is used as a catalyst, preferably, an activator of aluminum alkoxides is added.

A divalent iron bistriphenylphosphine complex ($FeCl_2(PPh_3)_2$), a divalent nickel bistriphenylphosphine complex ($NiCl_2(PPh_3)_2$), and a divalent nickel bistributylphosphine complex ($NiBr_2(PBu_3)_2$) are also preferably used as a catalyst.

Preferably, the polymerization is carried out in a solvent. The solvent includes hydrocarbon solvents (e.g., benzene, toluene), ether solvents (e.g., diethyl ether, tetrahydrofuran, diphenyl ether, anisole, dimethoxybenzene), halogenohydrocarbon solvents (e.g., methylene chloride, chloroform, chlorobenzene), ketone solvents (e.g., acetone, methyl ethyl ketone, methyl isobutyl ketone), alcohol solvents (e.g., methanol, ethanol, propanol, isopropanol, butyl alcohol, t-butyl alcohol), nitrile solvents (e.g., acetonitrile, propionitrile, benzonitrile), ester solvents (e.g., ethyl acetate, butyl acetate), carbonate solvents (e.g., ethylene carbonate, propylene carbonate), amide solvents (e.g., N,N-dimethylformamide, N,N-dimethylacetamide), hydrochlorofluorocarbon solvents (e.g., 1,1-dichloro-1-fluoroethane, dichloropentafluoropropane), hydrofluorocarbon solvents (e.g., hydrofluorocarbons having 2 to 5 carbon atoms, hydrofluorocarbons having 6 or more carbon atoms), perfluorocarbon solvents (e.g., perfluoropentane, perfluorohexane), alicyclic hydrofluorocarbon solvents (e.g., fluorocyclopentane, fluorocyclobutane), oxygen-containing fluorine solvents (e.g., fluoroether, fluoropolyether, fluoroketone, fluoroalcohol), and water. One alone or two or more kinds of these solvents may be used either singly or as combined. Polymerization may also be carried out in an emulsion system or in a system containing a supercritical fluid $CO_2$ as a medium.

Introduction of Polymerization Initiation Group

For forming the polymer chain aggregate according to, for example, a grafting-from method, a polymerization initiation group that is to be a starting point for polymerization reaction is introduced into a substrate, and from the polymerization initiation group, a polymer chain is grown as a graft according to the above-mentioned polymerization method.

The polymerization initiation group includes a halogenoalkyl group and a halogenosulfonyl group.

Preferably, the polymerization initiation group bonds physically or chemically to the surface of a substrate in point of the ability thereof to control the graft chain density (graft density) and the primary structure (molecular weight, molecular weight distribution, monomer sequence) of grafted polymer chains. For introducing (bonding) the polymerization initiation group to the surface of a substrate, a chemical adsorption method or a Langmuir-Blodgett's (LB) method may be employed.

For example, for introduction of a chlorosulfonyl group (polymerization initiation group) onto the surface of a silicon wafer (substrate) through chemical bonding thereto, 2-(4-chlorosulfonylphenyl)ethyltrimethoxysilane or 2-(4-chlorosulfonylphenyl)ethyltrichlorosilane may be reacted with the oxidation layer of the silicon wafer surface.

In introducing a polymerization initiation group according to an LB method, a film forming material containing a polymerization initiation group is dissolved in a suitable solvent (e.g., chloroform, benzene). Next, a small amount of the solution is spread onto a clean liquid surface, preferably onto a pure water surface, and then the solvent is evaporated away, or is diffused into the neighboring aqueous phase to thereby form a low-density film of film-forming molecules on the liquid surface.

Subsequently, the partition is mechanically swept on the liquid surface to reduce the surface area of the liquid surface on which the film-forming molecules have spread, thereby compressing the membrane to increase the density thereof, and thus forming a dense monomolecular membrane on the liquid surface.

Next, under appropriate conditions, while the surface density of the molecules constituting the monomolecular membrane on the liquid surface is kept constant, the substrate with the monomolecular layer deposited thereon is dipped in or is drawn up in the direction cutting across the monomolecular membrane on the liquid surface so as to transfer the monomolecular membrane on the liquid surface onto the substrate to deposit the monomolecular layer on the substrate.

For details of the LB method, reference may be made to "Fukuda, K., et al., New Experimental Chemistry Course, Vol. 18 (Interface and Colloid), Chap. 6 (1977), Maruzen"; "Fukuda, K., Sugi, M., Sasabe, H., LB Membrane and Electronics (1986), CMC"; or "Ishii, T., Practical Technique for Forming Good LB Membrane, (1989), Kyoritsu Publishing".

In introducing a polymerization initiation group into the surface of a substrate, preferably, a substrate surface is treated with a surface treatment agent having at least one of a group bonding to a substrate and a group having hydrophilicity for a substrate, and at least one of a group bonding to a polymerization initiation group and a group having hydrophilicity for a polymerization initiation group. The surface treatment agent may be a low-molecular compound or a high-molecular compound.

As the surface treatment agent, for example, a compound represented by the following general formula (10) can be used.

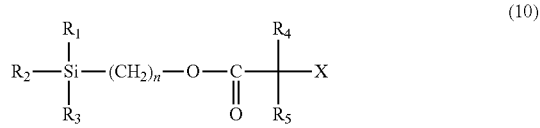

(10)

In the general formula (10), n represents an integer of 1 to 10, preferably an integer of 3 to 8, most preferably 6.

$R_1$, $R_2$ and $R_3$ each independently represent a substituent. At least one of $R_1$, $R_2$ and $R_3$ is preferably an alkoxyl group or a halogen atom. Especially preferably, all of $R_1$, $R_2$ and $R_3$ are methoxy groups or ethoxy groups.

$R_4$ and $R_5$ each independently represent a substituent. $R_4$ and $R_3$ each are preferably an alkyl group having 1 to 3 carbon atoms, or an aromatic functional group, and for example, most preferably both of $R_4$ and $R_5$ are methyl groups.

X represents a halogen atom, and is preferably Br.

As the surface treatment agent, use of a silane coupling agent containing a polymerization initiation group (a polymerization initiation group-containing silane coupling agent) is also preferred. Using this, surface treatment and introduction of a polymerization initiation group can be attained at the same time.

Regarding description of the polymerization initiation group-containing silane coupling agent and a production method for it, reference may be made to WO2006/087839. Specific examples of the polymerization initiation group-containing silane coupling agent include (2-bromo-2-methyl)propionyloxyhexyltriethoxysilane (BHE), and (2-bromo-2-methyl)propionyloxypropyltriethoxysilane (BPE).

Here, in the case of using a polymerization initiation group-containing silane coupling agent as a surface treatment agent from the viewpoint of controlling the graft density, preferably, a silane coupling agent not containing a polymerization initiation group, for example, an ordinary alkylsilane coupling agent is used along with it. With that, by controlling the ratio of the polymerization initiation group containing silane coupling agent and the silane coupling agent not containing a polymerization initiation group, the graft density can be changed in any desired manner. For example, in the case where all the silane coupling agent is a polymerization initiation group-containing silane coupling agent, graft polymerization may be canned out according to a grafting-from method after the surface treatment to thereby grow the polymer chains in a surface occupancy of more than 3%.

In the case where a polymerization initiation group-containing silane coupling agent is used as a surface treatment agent, the polymerization initiation group-containing silane coupling agent may be hydrolyzed in the presence of water to be a silanol, and after converted into an oligomer state through partial condensation, the oligomer may be used for surface treatment. Specifically, for example, the oligomer is adsorbed to a substrate such as silica in a mode of hydrogen bonding, and then dried to cause dehydrating condensation and the polymerization initiation group may be introduced into the substrate.

(Substrate)

The substrate as a carrier for polymer chain immobilization thereon may be appropriately selected from organic materials, inorganic materials and metal materials, and may be a hydrophobic substrate or a hydrophilic substrate.

Solids for use for the substrate include polyurethane materials, polyvinyl chloride materials, polystyrene materials, polyolefin materials, poly(methyl methacrylate), polyethylene terephthalate, cellulose acetate, paper, plastic-laminated films, and ceramics (e.g., alumina ceramics, bioceramics, composite ceramics such as zirconia-alumina composite ceramics).

As solids for use for the substrate, also mentioned are metals (e.g., iron, iron alloys such as cast iron, steel, stainless steel, carbon steel and steel material for high-carbon chromium bearing steel (SUJ2), and non-ferrous materials and non-ferrous alloys such as aluminum, zinc, copper, titanium), metal-deposited paper, silicon such as polycrystalline silicon, silicon oxide, silicon nitride, various types of glass, quartz, and composite materials thereof.

Preferred examples of hydrophobic organic materials usable as the substrate include polyolefins (e.g., polyethylene, polypropylene, polyisobutylene, ethylene-α-olefin copolymers), silicone polymers, acrylic polymers (e.g., polyacrylonitrile, polymethyl methacrylate, polyethyl methacrylate, polyethyl acrylate), and copolymers thereof.

As hydrophobic organic materials for use as the substrate, also preferred are fluoropolymers polytetrafluoroethylene, chlorotrifluoroethylene, ethylene fluoride-propylene, polyvinyl fluoride), vinyl polymers (e.g., polyvinyl chloride, polyvinyl methyl ether, polystyrene, polyvinyl acetate, polyvinyl ketone), and copolymers thereof.

As hydrophobic organic materials for use as the substrate, also preferred are vinyl monomer-containing copolymers (e.g., ABS), natural and synthetic rubbers (e.g., latex rubber, butadiene-styrene copolymer, polyisoprene, polybutadiene, butadiene-acrylonitrile copolymer, polychloroprene, polymer, polyisobutylene rubber, ethylene-propylene-diene copolymer, polyisobutylene-isoprene), and copolymers thereof.

As hydrophobic organic materials for use as the substrate, also preferred are polyurethanes (e.g., polyether urethane, polyester urethane, polycarbonate urethane, polysiloxane urethane), polyamides (e.g., nylon 6, nylon 66, nylon 10, nylon 11), polyesters, epoxy polymers, cellulose, modified celluloses, and copolymers thereof.

As hydrophilic organic materials for use as the substrate, preferred are hydrophilic acrylic polymers (e.g., polyacrylamide, poly-2-hydroxyethyl acrylate, poly-N,N-dimethylacrylamide, polyacrylic acid, polymethacrylic acid), and copolymers thereof.

As hydrophilic organic materials for use as the substrate, also preferred are hydrophilic vinyl polymers (e.g., poly-N-vinylpyrrolidone, polyvinylpyridine), polymaleic acid, poly-2-hydroxyethyl fumarate, maleic anhydride, polyvinyl alcohol, and copolymers thereof.

The shape of the substrate is not specifically limited, for example, preferred are tubes, sheets, fibers, strips, films, plates, foils, membranes, pellets, powders, fine particles and molded articles (e.g., extrusion-molded articles, cast-molded articles). A member itself, to which the clearance narrowing material is applied, may be used as the substrate as it is.

Among them, fine particles of materials mentioned below are preferably used as a particulate substrate.

The material for the fine particles of the substrate may be any of inorganic substances and organic substances. For example, inorganic substances, such as silicon oxides such as silica; noble metals such as Au, Ag, Pt and Pd; transition metals such as Ti, Zr, Ta, Sn, Zn, Cu, V, Sb, In, Hf, Y, Ce, Sc, Eu, Ni, Co and Fe, and oxides or nitrides thereof; and organic substances such as polymers can be used.

The mean particle size of the fine particles for use for the substrate is preferably 5 nm to 30 μm, more preferably 10 nm to 10 μm, even more preferably 10 nm to 1 μm. With that, graft chains can be grown in a high density around the fine particles as cores.

The mean particle size of the fine particles (composite fine particles) on which polymer chain aggregates are formed is preferably 10 nm to 30 μm, more preferably 10 nm to 20 μm, even more preferably 15 nm to 10 μm, and especially preferably 20 nm to 3 μm. The composite fine particles are preferably composite fine particles having a narrow particle size distribution in which the particle size fluctuation is 20% or less.

The mean particle size and the particle size fluctuation of the fine particles for use as the substrate and those of the fine particles on which polymer chain aggregates are formed can be measured according to a dynamic light scattering (DLS) method.

The fibers for use for the substrate include commercially-available fibers of cotton, regenerated cellulose, polyethylene terephthalate or polyvinyl alcohol, nanofibers formed by electrospinning, as well as naturally-available cellulose nanofibers and bacterial cellulose.

In the case where the substrate is a member itself to which the clearance narrowing material is applied, such as a member to constitute a fitting member structure, a member to partition a fluid channel, or a member to constitute a slide mechanism, the material of the substrate is preferably metal (e.g., iron, iron alloys such as stainless steel, carbon steel, cast iron, steel or SUJ2, and non-ferrous materials and non-ferrous alloys such as aluminum, zinc, copper, titanium), resin (e.g., polyethylene, polyphenylene sulfide, polytetrafluoroethylene), silicon wafer, glass or quartz.

(Number-Average Molecular Weight and Molecular Weight Distribution of Polymer Chain)

The number-average molecular weight ($M_n$) of the polymer chain to form the polymer chain aggregate is preferably 500 to 10,000,000, more preferably 100,000 to 10,000,000.

The molecular weight distribution index (PDI=$M_w/M_n$) of the polymer chain aggregate is preferably 1.5 or less, more preferably 1.01 to 1.5.

When the number-average molecular weight ($M_n$) and the molecular weight distribution index (PDI) of the polymer chain each fall within the above-mentioned range, the clearance narrowing material can exhibit more excellent clearance narrowing effects and mechanical properties and can have low friction properties.

For measurement of the number-average molecular weight ($M_n$) of the polymer chain and the molecular weight distribution index ($M_w/M_n$) thereof, a method may be employed where the polymer chain is cut out from the substrate through treatment with hydrofluoric acid, and the cut-out polymer chain is analyzed to measure the molecular weight thereof through size exclusion chromatography.

Alternatively, on the presumption that a free polymer to form during polymerization for polymer chain production has the same molecular weight as that of the polymer chain to be immobilized on the substrate, the number-average molecular weight ($M_n$) of the free polymer and the molecular weight distribution index ($M_w/M_n$) thereof are measured according to size exclusion chromatography, and the resultant data may be employed here as they are for the number-average molecular weight ($M_n$) of a polymer chain and the molecular weight distribution index ($M_w/M_n$) thereof. It has already been confirmed that the polymer chain to be immobilized on a substrate and the free polymer to form during polymerization are nearly the same in point of the number-average molecular weight ($M_n$) and the molecular weight distribution index ($M_w/M_n$) thereof.

A method for measuring the molecular weight using a free polymer is specifically described below.

In producing a polymer chain through surface-initiated living radical polymerization, a free initiator is added to the polymerization solution, and in the case, a free polymer having the same molecular weight and the same molecular weight distribution as those of the polymer chain to constitute a polymer chain aggregate can be produced. The free polymer is analyzed through size exclusion chromatography to determine the number-average molecular weight ($M_n$) and the molecular weight distribution index ($M_w/M_n$) thereof. In size exclusion chromatography analysis, a method of calibration using a standard sample of the same kind of an available monodispersion having a known molecular weight and a method of absolute molecular weight evaluation using a multi-angle light scattering detector are carried out.

(Density of Polymer Chain)

Preferably, the density of the polymer chain in the polymer chain aggregate fails within a range mentioned below, though varying depending on the type of the polymer chain and the type of the liquid substance with which the polymer chain aggregate is impregnated. Accordingly, the clearance narrowing material can exhibit more excellent clearance narrowing effects and mechanical properties and can have low friction properties.

In the case where the polymer chain is a poly(methyl methacrylate; (PMMA), the density of the polymer chain in the polymer chain aggregate is preferably 0.1 chain/nm$^2$ or more, more preferably 0.15 chain/nm$^2$ or more, even more preferably 0.2 chain/nm$^2$ or more, still more preferably 0.3 chain/nm$^2$ or more, especially more preferably 0.4 chain/nm$^2$ or more, and most preferably 0.45 chain/nm$^2$ or more.

In the case where the polymer chain is poly(lauryl methacrylate) (PLMA), the density of the polymer chain in the polymer chain aggregate is preferably 0.44 chain/nm$^2$ or more, more preferably 0.06 chain/nm$^2$ or more, even more preferably 0.08 chain/nm$^2$ or more, still more preferably 0.12 chain/nm$^2$ or more, especially more preferably 0.16 chain/nm$^2$ or more, and most preferably 0.18 chain/nm$^2$ or more.

In the case where the polymer chain is poly(N,N-diethyl-N-(2-methacryloyl ethyl)-N-methyl ammonium bis(trifluoromethylsulfonyl)imide) (PDEMM-TFSI), the density of the polymer chain in the polymer chain aggregate is preferably 0.02 chain/nm$^2$ or more, more preferably 0.03 chain/nm$^2$ or more, even more preferably 0.04 chain/nm$^2$ or more, still more preferably 0.06 chain/nm$^2$ or more, especially more preferably 0.08 chain/nm$^2$ or more, and most preferably 0.09 chain/nm$^2$ or more.

The density of a polymer chain may be measured according to a method for measuring a graft density method described, for example, in Macromolecules, 31, 5934-5936 (1998), Macromolecules, 33, 5608-5612 (2000), or Macromolecules, 38, 2137-2142 (2005).

Specifically, the density (chain/nm$^2$) of a polymer chain may be determined from the graft amount (W) and the number-average molecular weight ($M_n$) of the graft chain, according to the following equation:

$$\text{Graft Density (chain/nm}^2\text{)} = W \text{ (g/nm}^2\text{)}/M_n \times \text{(Avogadro constant)}$$

wherein W represents a graft amount and $M_n$ represents a number-average molecular weight.

The graft amount (W) may be measured as follows. In the case where the substrate is a plane substrate such as a silicon wafer, the film thickness in a dry state is measured through ellipsometry measurement, that is, the thickness of the grafted polymer chain layer in a dry state is measured, and using the density of the bulk film, the graft amount (W) per unit area is calculated.

In the case where the substrate is fine particles such as silica particles, the graft amount (W) may be measured through infrared absorption spectrometry (IR), thermogravimetric loss measurement (TG) or elementary analysis.

Regarding the method for measurement of a number-average molecular weight ($M_n$), reference may be made to the description in the section of (Number-Average Molecular Weight and Molecular Weight Distribution Index of Polymer Chain).

(Surface Occupancy of Polymer Chain)

The surface occupancy of the polymer chain in the surface of a substrate (cross section of polymer×graft density×100) is preferably 3% or more, more preferably 5% or more, even more preferably 10% or more. The surface occupancy means a ratio of the graft point (the first constituent unit) occupying the surface of a substrate, and it is 100% in closest packing.

Regarding the method for calculating the graft density, reference may be made to the description in the section of (Density of Polymer Chain Aggregate). The cross section of a polymer can be determined using the recurring unit length of the polymer in a fully stretched state, and the bulk density thereof.

Here, a polymer chain aggregate having a surface occupancy of 3% or more is a concentrated polymer brush (CBP) that forms a concentrated solution when swollen with a good solvent, and exhibits advantageous characteristics as a clearance narrowing material, as compared with a dilute polymer brush. Specifically, when swollen with a good solvent, the polymer chains in a concentrated polymer brush are elongated in such a high degree as comparable to the chain length owing to a large osmotic pressure effect because of the concentration solution system thereof, and simultaneously with increase in the thickness thereof, such a concentrated polymer brush gives a high compression resistance. In addition, the concentrated polymer brush expresses a definite size exclusion effect that does not take molecules larger than a certain size into the brush layer, and further shows a remarkable low friction properties since the polymer chains are prevented from being entangled owing to compression. Consequently, the concentrated polymer brush has an extremely high effect of narrowing a clearance and enhancing the sealing performance against a fluid of the clearance, and even when arranged in a clearance that may receive a strong force such as a fitting member structure (clearance of a fitting member structure), it is hardly worn and can contribute toward a smooth movement of the member structure. Consequently, the concentrated polymer brush is extremely effective as a clearance narrowing material and, in particular, a concentrated polymer brush having a molecular weight distribution index of 1.5 or less is especially useful as a clearance narrowing material.

In the case where the substrate is fine particles, preferably, the surface occupancy of the polymer chain is a few % or more so that the polymer chain is in a high density, and is more preferably 5 to 50%, even more preferably 10 to 40%. Having a graft density that falls within the range, the graft chains may have an anisotropic configuration (high-elongation configuration).

[B] Polymer Having Bottle Brush Structure

Next described is a polymer having a bottle brush structure.

A bottle brush structure is a branched polymer structure where multiple side chains branch from the main chain therein to form a bottle brush-like shape as a whole. In such a polymer having a bottle brush structure, the main chain constitutes a substrate for a clearance narrowing material and the side chains constitute the polymer chains of a clearance narrowing material, and further a polymer having a bottle brush structure may be immobilized on a substrate serving as a carrier. For the explanation, preferred ranges and specific examples of the substrate, reference may be made to the description in the section of (Substrate) of polymer brush given hereinabove. In this case, both the polymer having a bottle brush structure and the polymer brush may be immobilized on a substrate. In this case, the polymer brush is preferably a concentrated polymer brush.

A polymer having a bottle brush structure may also be produced according to a graft polymerization method. Graft polymerization includes a grafting-to method of introducing reactive side chains (graft chains) that have been previously synthesized into a stem polymer to be a main chain, a grafting-from method of growing side chains (graft chains from the polymerization initiation group of a macro-initiator (a stem polymer into which a polymerization initiation group has been introduced), and a grafting-through method of polymerizing a macromonomer (a polymer having a polymerizing functional group at a terminal of a side chain-constituting polymer). For synthesis of such side chains or a stem polymer, living anionic polymerization, ring-opening metathesis polymerization (ROMP) or highly-popular living radical polymerization (LRP) can be used.

Preferred examples of the polymer having a bottle brush structure include compounds represented by the following general formula (11).

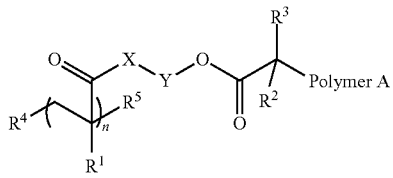

(11)

In the general formula (11), $R^1$ and $R^2$ each independently represent a hydrogen atom or a methyl group, $R^3$ represents a substituent, preferably an alkyl group having 1 to 10 carbon atoms. $R^4$ and $R^5$ each represent a terminal group of an atom or an atomic group, including a hydrogen atom, a halogen atom or a functional group derived from a polymerization initiator. X represents O or NH, Y represents a divalent organic group, n represents an integer of 10 or more, Polymer A represents a polymer chain. In the compound represented by the general formula (11), the recurring structure of a constituent unit parenthesized by n corresponds to the main chain of a bottle brash structure, and Polymer A corresponds to the side chain of a bottle brush structure.

The organic group represented by Y includes an alkylene group having 1 to 10 carbon atoms, an oxyalkylene group (RO) having 1 to 5 carbon atoms (R represents alkylene group having 1 to 5 carbon atoms) a linking structure formed by linking multiple such oxyalkylene groups, or a divalent organic group of at least two combinations of these organic groups (an alkylene group having 1 to 10 carbon atoms, an oxyalkylene group having 1 to 5 atoms, and a linking structure of oxyalkylene groups). Here, the alkylene group and the alkylene group of the oxyalkylene group may be linear or branched, and may have a cyclic structure. Specific examples of the alkylene group include an ethylene group, a propylene group, a butylene group and a cyclohexylene group. The alkylene group and the alkylene group of the oxyalkylene group each may be substituted with a substituent. The substituent includes an alkyl group having 1 to 10 carbon atoms, an aryl group having 6 to 40 carbon atoms, and a heteroaryl group having 3 to 40 carbon atoms, and these substituents each may be further substituted with a substituent.

For the description, preferred ranges and specific examples of the Polymer A, reference may be made to the description in the section of (Polymer Chain) given hereinabove. In multiple constituent units of the main chain, Polymer A may be the same as or different from each other.

(Surface Occupancy of Side Chain)

For a polymer having a bottle brush structure, a situation is simulated where the main chain is a central axis, side chains graft chains) are linearly extended from the central axis and the top end of each extended side chain is contained in one plane, and in the simulated situation, the outer form of the polymer can be considered to be a column having the top-containing face as a side face. In a polymer having such an outer form, the density of the graft chains on the side face thereof lowers with the increase in the length of each graft chain so that the structural freedom degree of the graft chain is thereby increased. As a result, the graft chain can be freely folded.

Here, the surface occupancy (σ*) of the bottle brush is represented by the following equation (1).

$$\sigma^* = \frac{\text{volume per one recurring unit in graft chain moiety [nm}^3\text{]}}{\text{length of recurring unit in graft chain moiety [nm])}} \times \sigma[\text{chain/nm}^2] \times 100 \quad (1)$$

In the equation (1), σ represents a graft density calculated according to the following equation (2), and the volume per one recurring unit in the graft chain moiety ($v_0$ [nm$^3$]) is calculated according to the following equation (3).

$$\sigma = \frac{1}{(2\pi \times \alpha \times \text{polymerization degree of graft chain moiety})\left(\frac{\alpha}{\text{grafting efficiency}}\right)} \quad (2)$$

In the equation (2), α represents a length of the recurring unit of the graft chain moiety.

$$v_0 = \frac{\text{molecular weight of monomer in graft chain moiety/Avogadro constant}}{\text{bulk density of monomer in graft chain moiety}} \quad (3)$$

In the equation (2), α represents a length of the recurring unit of the graft chain moiety.

In the equation (1), where the graft chain moiety is formed of a vinyl monomer, the length of the recurring unit of the graft chain moiety is 0.25 nm. Accordingly, in the case, the equation (1) can be converted into the following equation (1').

$$\sigma^* = \frac{\text{volume per one recurring unit in graft chain moiety [nm}^3\text{]}}{0.25 \text{ [nm]}} \times \sigma[\text{chain/nm}^2] \times 100 \quad (1')$$

In the equation (1'), α represents a graft density calculated according to the following equation (2').

$$\sigma = \frac{1}{(2\pi \times 0.25 \times \text{polymerization degree of graft chain moiety}\left(\frac{0.25}{\text{grafting efficiency}}\right)} \quad (2')$$

The graft density (σ) calculated according to the equations (2) and (2') indicates a number of the graft chains per unit area on the polymer-side face, and therefore the surface occupancy (σ*) calculated according to the equations (1) and (1') is a value representing the proportion of the graft chain top end in the polymer side face in a condition where the graft chain is kept extended linearly upward toward the vertical direction from the main chain. The surface occupancy (σ*) indicates a value of 0 to 100%, and a larger value thereof means that the proportion of the graft chain top end in the polymer side face is larger so that the degree of freedom of the graft chain is thereby restrained. Specifically, the surface occupancy is a numerical value to reflect a degree of freedom of a graft chain, and therefore in a polymer where a surface occupancy (σ*) is higher, the degree of freedom of the structure of the graft chain therein is restrained. As a result, the graft chain can maintain a state extended nearly in the vertical direction relative to the main chain, and therefore the polymer is presumed to exhibit properties peculiar to the structure.

Preferably, a polymer having a bottle brush structure has a surface occupancy (σ*), as calculated in the manner as above, of 3% or more. With that, a polymer having a bottle brush structure exhibits the same properties as those of the above-mentioned concentrated polymer brush, and therefore can be used effectively as a clearance narrowing material. The upper limit of the surface occupancy is not specifically limited, but is generally 100% or less. The surface occupancy of a polymer having a bottle brush structure is, for example, preferably 3% or more, more preferably 5% or more, even more preferably 10% or more.

[Other Components]

The clearance narrowing material of the present invention may be composed of a polymer chain aggregate alone or a bottle brush structure-having polymer atone, or may contain any other component. The other component includes a liquid substance capable of swelling a polymer chain aggregate, and preferably, the liquid substance for use herein is a lubricant. When swollen with a liquid substance, the polymer chains in a polymer chain aggregate are elongated, and the polymer chain aggregate in the condition can therefore exhibit excellent clearance narrowing effects and mechanical properties and can have low friction properties.

As a lubricant, a good solvent can be used. A good solvent varies depending on the type of the polymer chain, and therefore may be appropriately selected in accordance with the type of the polymer chain that the clearance narrowing material contains.

For example, in the ease where the polymer chain constituting a polymer chain aggregate is poly(methyl methacrylate), the good solvent to be used herein is preferably an aprotic solvent such as toluene, or a hydrophobic ionic liquid.

In the case where the polymer chain to constitute a polymer chain aggregate is poly(2-hydroxyethyl methacrylate), preferably, a polar solvent such as methanol is used as the good solvent.

In the case where the polymer chain to constitute a polymer chain aggregate is a hydrophilic polymer chain, preferably, a water-based solvent that contains water is used as the good solvent.

From the viewpoint of non-volatility, flame retardancy, heat resistance and electrochemical stability, an ionic liquid is preferably used as a lubricant in the case where the affinity thereof to the polymer chain is high (especially in the case where the polymer chain has an ionic dissociating group).

The ionic liquid may also be called an ambient temperature molten salt, and this is a low-melting-point salt having ionic conductivity. Most ionic liquids are obtained by combining a cation of an organic onium ion and an organic or inorganic anion, and are characterized by having a relatively low melting point. The melting point of the ionic liquid is generally 100° C. or lower, preferably room temperature (25° C.) or lower.

The melting point of an ionic liquid can be measured using a differential scanning calorimeter (DSC).

A compound represented by the following general formula (10) can be used as the ionic liquid, and the melting point of the ionic liquid is preferably 50° C. or lower, more preferably 25° C. or lower.

(10)

In the general formula (10), $R^3$, $R^4$, $R^5$, and $R^6$ each independently represent an alkyl group having 1 to 5 carbon atoms, or an alkoxyalkyl group represented by $R'$—O—$(CH_2)_n$—, $R'$ represents a methyl group or an ethyl group, and n represents an integer of 1 to 4. $R^3$, $R^4$, $R^5$, and $R^6$ may be the same as or different from each other. Any two of these $R^3$, $R^4$, $R^5$, and $R^6$ may bond to each other to form a cyclic structure. However, at least one of $R^3$, $R^4$, $R^5$, and $R^6$ is an alkoxyalkyl group. X represents a nitrogen atom or a phosphorus atom, and Y represents a monovalent anion.

The alkyl group having 1 to 5 carbon atoms for $R^3$, $R^4$, $R^5$, and $R^6$ includes a methyl group, an ethyl group, an n-propyl group, a 2-propyl group, an n-butyl group, and an n-pentyl group.

In $R^3$, $R^4$, $R^5$, and $R^6$, the alkoxyalkyl group represented by $R'$—O—$(CH_2)_n$— is preferably a methoxymethyl group, an ethoxymethyl group, a 2-methoxyethyl group, a 2-ethoxyethyl group, a 3-methoxypropyl group, a 3-ethoxypropyl group, a 4-methoxybutyl group or a 4-ethoxybutyl group.

The compounds where any two of $R^3$, $R^4$, $R^5$, and $R^6$ bond to each other to form a cyclic structure and where X represents a nitrogen atom for use herein are preferably quaternary ammonium salts having an aziridine ring, an azetidine ring, a pyrrolidine ring or a piperidine ring; and where X represents a phosphorus atom, the compounds are preferably quaternary phosphonium salts having a pentamethylene phosphine (phosphorinane) ring.

Quaternary ammonium salts having, as a substituent, at least one 2-methoxyethyl group where R' is a methyl group and n is 2 are preferred.

Quaternary salts having a methyl group, two ethyl groups and an alkoxyethyl group and represented by the following general formula (11) are also preferred for use as the ionic liquid.

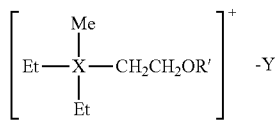

(11)

In the general formula (11), R' represents a methyl group or an ethyl group, X represents a nitrogen atom or a phosphorus atom, and Y represents a monovalent anion. Me represents a methyl group, and Et represents an ethyl group.

The monovalent anion Y in the general formulae (10) and (11) is not specifically limited.

As the monovalent anion Y, preferred is use of $BF_4—$, $PF_6—$, $AsF_6—$, $SbF_6—$, $AlCl_4—$, $NbF_6—$, $HSO_4—$, $ClO_4—$, $CH_3SO_3—$, $CF_3SO_3—$, $CF_3CO_2—$, $(CF_3SO_2)_2N—$, $Cl—$, $Br—$, or $I—$.

As the monovalent anion Y, especially preferred is $BF_4—$, $PF_6—$, $(CF_3SO_2)_2N—$, $CF_3SO_3—$, or $CF_3CO_2—$, from the viewpoint of the dissociation degree, the stability and the mobility thereof in a non-aqueous organic solvent.

Among the quaternary salts represented by the general formulae (10) and (11), specific examples of quaternary ammonium salts and quaternary phosphonium salts preferred for use herein include compounds represented by the following formulae (12) to (20) wherein Me represents a methyl group, and Et represents an ethyl group. Above all, use of the quaternary ammonium salt represented by the following formula (12) or (17) is more preferred. Further, in consideration of having a low viscosity and therefore having the ability to more reduce a kinematic frictional coefficient in sliding, use of a quaternary ammonium salt represented by the following formula (17) is especially preferred.

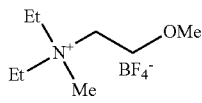

(12)

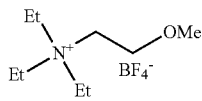

(13)

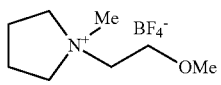

(14)

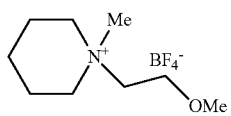

(15)

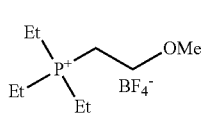

(16)

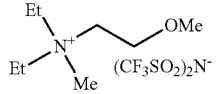

(17)

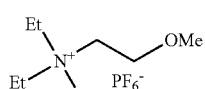

(18)

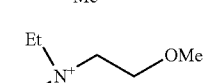

(19)

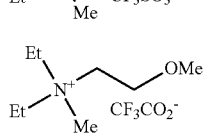

(20)

Any other ionic liquid than the compounds represented by the general formulae (10) and (11) is also usable as a rublicant Examples of the other ionic liquid include an ionic liquid containing an imidazolium ion repented by the following general formula (21), or an ionic liquid containing an aromatic cation.

For the description and specific examples of the counter anion to form an ionic liquid containing an imidazolium ion or an ionic liquid containing any other aromatic cation, reference may be made to the description and specific examples of Y in the general formulae (10) and (11) given hereinabove.

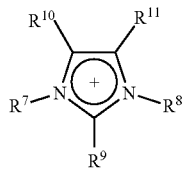

(21)

In the general formula (21), $R^7$ represents an alkyl group having 1 to 4 carbon atoms, or a hydrogen atom, and is especially preferably a methyl group.

$R^8$ represents an alkyl group having 10 or less carbon atoms and may optionally contain an ether bond. Especially preferably, $R^8$ is an ethyl group.

$R^9$, $R^{10}$, and $R^{11}$ each independently represent a hydrogen atom or an alkyl group having 1 to 20 carbon atoms, and may optionally contain an ether bond.

An ionic liquid containing an aromatic cation, such as compounds represented by any of the following formulae (22) to (27), is also preferred for use as a lubricant.

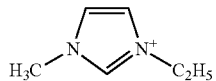

(22)

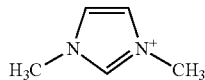

(23)

-continued

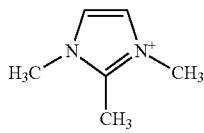
(24)

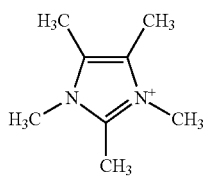
(25)

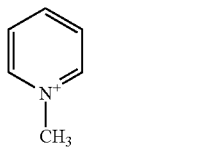
(26)

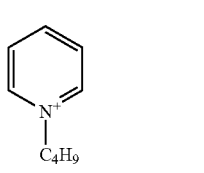
(27)

In the present invention, the method of swelling a polymer chain aggregate with a liquid substance is not specifically limited. For example, preferred is a method of applying a liquid substance to the surface of a polymer chain aggregate followed by keeping it as such, or a method of immersing a substrate having, as formed thereon, a polymer chain aggregate in a liquid substance.

[Properties of Clearance Narrowing Material]
(Thickness of Polymer Chain Aggregate)

In the clearance narrowing material of the present invention, the dry thickness of the polymer chain aggregate is preferably 200 μnm or more, more preferably 500 nm or more, even more preferably 1000 nm or more. With that, the clearance narrowing material can realize a lubricant film thickness falling within a preferred range mentioned below, when the polymer chain aggregate therein is swollen.

The thickness (swollen thickness) of the polymer chain aggregate in a swollen state is preferably 500 nm or more, more preferably 700 nm or more, even more preferably 800 nm or more, and especially preferably 1,000 nm or more. With that, the space of a clearance where the clearance narrowing material is arranged can be effectively narrowed, and therefore the clearance can realize a better sealing performance and more excellent mechanical properties and lower friction properties.

The preferred ranges of the dry film thickness and the swollen film thickness are those for the case where the polymer chain aggregate is applied to a silicon wafer substrate.

The film thickness in a swollen state of the polymer chain aggregate is preferably 1.5 times or more of the dry film thickness of the polymer chain aggregate, more preferably 2 times or more, and even more preferably 3 times or more.

The swollen film thickness of the polymer chain aggregate can be controlled by the chain length (the number of the constituent units) of the polymer chain and the surface occupancy (density) thereof. In the clearance narrowing material, the polymer chain aggregate is a thickened polymer brush, and especially preferably, the film thickness thereof in a swollen state is 500 nm or more.

The dry film thickness of the polymer chain aggregate can be measured through spectroscopic ellipsometry.

The swollen film thickness of the polymer chain aggregate can be measured according to the following method.

Under an atmospheric pressure at room temperature, a polymer chain aggregate is impregnated with a good solvent to form a swollen layer, and the swollen layer is applied to a flat substrate (model substrate) of the same kind as that of the clearance constitutive member to be tested, and is analyzed according to an atomic force microscope (AFM) colloid probe method. Specifically, a silica probe particle having a diameter of 10 μm is immobilized to the tip of an cantilever, and the force curve (distance dependency of repulsive force) to the swollen layer of the clearance narrowing material is measured with an atomic force microscope and, in addition, an area around the boundary of a scratched part of the swollen layer is observed through AFM imaging under a maximum load in force curve measurement to thereby evaluate the height difference profile. Here, a value calculated by adding the step difference at around a boundary to the maximum indentation length obtained from the force curve is referred to as a swollen film thickness.

(Indentation Depth and Compressive Elasticity Modulus of Polymer Chain Aggregate)

In the clearance narrowing material, of the present invention, the indentation depth of the polymer chain aggregate is preferably 100 nm or more, more preferably 120 nm or more, and even more preferably 150 mm or more.

Preferably, in the clearance narrowing material of the present invention, the compressive elasticity modulus of the polymer chain aggregate is 0.1 MPa or more, more preferably 1 MPa or more, even more preferably 10 MPa or more.

With that, the clearance narrowing material can support a large load and, even when the dimensional accuracy and the mechanical accuracy of the members that form a clearance are low, the material can absorb the error and can effectively fill up the space of the clearance, and additionally can contribute toward realizing smooth movement without obstructing the relative movement of the members that form the clearance. In particular, in the case where the clearance narrowing material is arranged in a clearance of a slide mechanism, the clearance narrowing material may receive a high surface pressure given thereto, and accordingly, the compressive elasticity modulus of the material falling within the range is effective in point of durability thereof.

The indentation depth and the compressive elasticity modulus of the clearance narrowing material can be measured according to an AFM colloid probe method. Specifically, at the tip of an AFM cantilever (for example, OMCL-RC800, Olympus Corp., spring constant 0.1 N/m), a silica probe particle having a diameter of 10 μm (HIPERECICA SP, Ube-Nitto Kasei, diameter 10 μm) is immobilized, and using an atomic force microscope (Nano-Wizard, JPK Instruments Inc.), the polymer chain aggregate is analyzed through force curve measurement. At this time, for evaluate the distance from the substrate surface, a part of the clearance narrowing material, in the silicon substrate is scratched, and the area around the scratched part is analyzed (AFM imaging) to evaluate the step difference therearound for force curve offset correction. For example, using a solvent such as o-dichlorobenzene for the clearance narrowing material, and using cantilevers each having a different spring constant (0.1 N/m, 0.57 N/m, 3.3 N/m, 51 N/m), and the results are combined to give a force curve in a broad load range. Preferably, the clearance narrowing material of the present invention secures an indentation depth of 100 nm or more, and from the force curve, the compressive elasticity modulus thereof can be estimated. The compressive elasticity modulus (Young's modulus) can be calculated according to the following equation for which a force distance curve is drawn from the force curve and a Hertz contact is presumed. Here, the Poisson ratio is 0.5. Regarding the details of the measurement procedure, reference may be made to Yamamoto, S. et al, Macromolecules, 33, 5602-5607, (2000); and Yamamoto, S. et al, Macromolecules, 33, 5608-5612, (2000).

$$F = \frac{4ER^{0.5}\delta^{1.5}}{3 - 3v^2}$$

In the equation, E represents a compressive elasticity modulus, $\delta$ represents an indentation depth, $v$ represents a Poisson ratio, R represents a colloid radius, and F represents a force.

(Frictional Coefficient of Clearance Narrowing Material)

Preferably, the frictional coefficient (u) of the clearance narrowing material of the present invention is 0.1 or less, more preferably 0.01 or less, even more preferably $10^{-3}$ or less. With that, even in a case of relative movement of one member constituting a clearance to the other member, the clearance narrowing material can realize smooth movement without obstructing the relative movement.

The frictional coefficient ($\mu$) of the clearance narrowing material can be measured in the manner mentioned below, using a narrow clearance model tester shown in FIG. 1.

A polymer chain aggregate as a clearance narrowing material is applied to the inner peripheral surface of a ring and to the outer peripheral surface of a rod, and a rod is inserted inside the ring. The inserted rod is so positioned that one side of the rod can be kept in contact with the top of the inner peripheral surface of the ring and the other side of the rod can be kept in contact with the bottom of the inner peripheral surface of the ring, and in this condition, 0.5 mL of an ionic liquid is injected into the top space. Subsequently, the rod is moved downward by 10 mm at a speed of 1 mm/s in the Z-axis direction. At this time, a slide resistance occurs between the ring and the rod and the ring thereby receives a force. The translational force that the ring has received and the moment are measured with a 6-component dynamometer to calculate the frictional coefficient $\mu$.

Regarding the detailed condition for the method for measurement of the frictional coefficient and the method for calculation of the frictional coefficient, reference may be made to the section of Examples.

Preferably, the clearance narrowing material has a compressive elasticity modulus of 1 MPa or more, and a frictional coefficient ($\mu$) of 0.1 or less, and also preferably, the lubricant film thickness is 10% or more of the clearance, more preferably 20% or more, even more preferably 30% or more.

[Use Embodiment of Clearance Narrowing Material]

The clearance narrowing material of the present invention can be used by immobilizing it on the surface on the clearance side of members to form a clearance. In the following description, the members to form a clearance may be referred to as clearance forming members, and the surface of on the clearance side of the members to form a clearance may be referred to as "a clearance forming face".

The surface on which the clearance narrowing material is immobilized may be one or both of the faces opposing to each other via a clearance (clearance forming faces), but is preferably both the two faces. With that, the clearance narrowing material can effectively narrow the clearance and, when the clearance forming members are composed of a pair of members that move relatively to each other, the clearance narrowing material can noticeably reduce the frictional coefficient between the members. Specifically, in a pair of members to which a swollen layer of a polymer chain aggregate is immobilized, when a load is applied thereto in such a manner that the surfaces of the swollen layers could be kept in contact with each other, the swollen layers could hardly undergo interpenetration of the polymer chains between them. Consequently, between the pair of members to which such a swollen layer has been immobilized, the clearance can be effectively narrowed depending on the bulkiness of the swollen layer, and in addition, the surfaces of the lubricant layers can slide on each other with no entanglement of the polymer chains between the lubricant layers, therefore exhibiting an extremely low friction performance.

Preferably, in use thereof, the clearance narrowing material of the present invention is swollen with a liquid substance. The clearance narrowing material may be swollen with a liquid substance before the material is immobilized on members, or may be swollen after immobilized on members. Regarding the method for swelling the clearance narrowing material with a liquid substance, reference may be made to the corresponding description in the section of "Other Components".

The method of immobilizing the clearance narrowing material of the present invention on clearance forming members is not specifically limited, but for example, the immobilization may be carried out as follows.

The clearance narrowing material can be produced, for example, by graft growth of polymer chains on the surface of a sheet-like substrate. The resultant sheet-like clearance narrowing material composite can be immobilized on the clearance forming face of a clearance forming member according to a known method of adhesion, welding or the like.

The clearance narrowing material can be produced, for example, through graft growth of polymer chains on the surface of a granular substrate. The resultant granular clearance narrowing material composite can be immobilized on the clearance forming face of a clearance forming member according to a known method of adhesion, welding or the like.

The clearance narrowing material can be produced, for example, through graft growth of polymer chains on the surface of a fibrous substrate. The resultant clearance narrowing material composite can be immobilized on the clearance forming face of a clearance forming member according to a known method of adhesion, welding or the like.

The clearance narrowing material can also be produced through graft growth of polymer chains on the clearance forming face of a clearance forming member as a substrate, in this case, the clearance narrowing material is formed in a form immobilized on a clearance forming member, and therefore an additional step of immobilizing the clearance narrowing material is unnecessary. Consequently, the process can be simplified.

The clearance narrowing material can be produced as a bottle brush-like polymer aggregate through graft growth of polymer chains from a main polymer chain of a substrate, as side chains growing from the main chain. The resultant bottle brush-shaped polymer aggregate is, in the form of a solution thereof, adhered to the clearance forming face of a clearance forming member and then annealed to be immobilized on the face. At this time, the clearance forming face to which the solution is adhered is preferably surface-treated with a solution of tetraethyl orthosilicate or the like so as to be coated with silica or the like. Apart from this, the bottle brush-like polymer solution may also be adhered to the clearance forming face by immersing the clearance forming member in the solution.

The width of the clearance of the clearance forming member to which the clearance narrowing material of the present invention is applied is, though not specifically limited thereto, preferably 15 μm or less, more preferably 10 μm or less, even more preferably 5 μm or less.

The effect of the clearance narrowing material for preventing fluid leakage can be evaluated by an effective thickness h of a polymer chain aggregate, as obtained as an index from the leakage amount of a fluid through a clearance when the clearance narrowing material is immobilized on a clearance forming member. Here, the effective thickness b of a polymer chain aggregate is represented by the following equation (4).

$$Q=a(h-b)^3 \qquad (4)$$

In the equation (4), h represents a radial clearance (μm); Q represents an amount (mL) of a liquid leaking from the clearance when a polymer chain aggregate is immobilized on the surface of a member that forms the clearance and then an ionic liquid of DEME-TFSI is put on an opening of the clearance; a represents a coefficient (mL/sec·μm$^3$) to be defined from experimental conditions (differential pressure in clearance, liquid viscosity, clearance length, clearance outer diameter); and h represents an effective thickness of the polymer chain aggregate in the clearance.

The effective thickness b of a polymer chain aggregate can be measured using a narrow clearance model tester shown in FIG. 1. For details of the measurement method, reference may be made to the description in the section of Examples.

The effective thickness b of a polymer chain aggregate in a swollen state is preferably 1.5 times or more of the dry thickness of the polymer chain aggregate, more preferably 2 times or more, even more preferably 3 times or more.

The ratio of the effective thickness b of the polymer chain aggregate to the radial clearance h in the clearance forming member on which the clearance narrowing material is fixed, is preferably 20% or more, more preferably 50% or more, even more preferably 80% or more.

By defining the width of the clearance and the effective thickness of the polymer chain aggregate each to fall within the above-mentioned range, the fluid leakage through the clearance can be effectively prevented.

<Clearance Narrowing Material Composite>

The clearance narrowing material composite of the present invention has the clearance narrowing material of the present invention and a substrate on which the clearance narrowing material is immobilized.

Regarding the description of the clearance narrowing material of the present invention, reference may be made to the description in the section of <Clearance Narrowing Material>; and regarding the description of the substrate, reference may be made to the description in the section of (Substrate) for the clearance narrowing material. Regarding the use embodiment of the clearance narrowing material composite, reference may be made to the description in the section of [Use Embodiment of Clearance Narrowing Material] for the clearance narrowing material.

<Use of Clearance Narrowing Material>

The clearance narrowing material of the present invention can be applied to clearances of various articles, and can be especially effectively applied to articles having a clearance through which a fluid can pass, through the clearance of which a fluid is required to be prevented from leaking out, as well as to articles in which one of a pair of members to form a clearance moves relatively to the other thereof (especially articles having a reciprocating slide mechanism having a narrow clearance), and journal bearings, scalings, pistons, labyrinth seals, etc. Specifically, the clearance narrowing material of the present invention is favorably applied to a clearance of a pair of members of a fitting member structure composed of a pair of finable members that have been fitted to each other, especially to a clearance between a fitting hole and a shaft of an article having a fitting hole and a shaft to be fitted into the fitting hole and having a mechanism in which the shaft undergoes reciprocating movement in the axial direction. When applied to such articles, the clearance narrowing material of the present invention can narrow the clearance therein and can effectively prevent leakage of a fluid through the clearance, and in addition, can contribute toward realizing smooth movement without obstructing relative movement in the articles.

EXAMPLES

The invention is described more specifically with reference to Examples and Comparative Examples given below. In the following Examples, the material used, its amount and ratio, the details of the treatment and the treatment process may be suitably modified or changed not overstepping the spirit and the scope of the invention. Accordingly, the scope of the present invention should not be limitatively interpreted by the Examples mentioned below.

[1] Test Apparatus Used for Evaluation

In the present Examples, an evaluation test for sealing performance and friction characteristics of a clearance sealing material was carried out using a narrow clearance model tester shown in FIG. 1 under the condition of a room temperature 25° C. and a humidity of 20 to 40%.

The narrow clearance model tester has a ring 2 detachably immobilized in the intermediate of a housing 1, a rod 3 to be inserted inside the ring 2, a rod moving mechanism 4 for positioning and reciprocating movement in the Z-axis direction of the rod 3, and a pressure measuring device 5. The space inside the housing 1 is partitioned into upper and lower parts by the ring 2, thereby forming a lower space 1a below the ring 2 and an upper space 1b above the ring 2. The lower space 1b is connected to the vacuum chamber of the pressure measuring device 5 via a connecting tube, and the upper space 1b constitutes a storage space for a fluid for use for evaluation of sealing performance. In the narrow clearance model tester, a narrow clearance between the inner peripheral face of the ring 2 and the outer peripheral face of the rod 3 corresponds to a clearance in which a clearance narrowing material is arranged. Here, as shown in FIG. 2, the width the clearance (length in the radial direction) is referred to as a "radial clearance h".

Details of the rod and the ring used in the present Examples are shown below. Here, multiple rods each having a different outer diameter falling within a range of 9.92 to 9.99 mm were prepared, and by changing the outer diameter of the rod to be inserted, the width of the clearance between the ring and the rod (radial clearance h) was controlled to fall within a range of 5 to 40 µm.

Details of Rod:
 Material: SUJ2
 Shaft length: 50 mm
 Surface roughness Ra: 0.01 µm
 Outer diameter: 9.92 to 9.99 mm Details of Ring:
 Material: SUJ2
 Shaft length: 10 mm
 Surface roughness Ra: 0.01 µm
 Inner diameter: 10.00 mm Clearance length: 10 mm (Sealing Performance Test)

The sealing performance test using the above-mentioned narrow clearance model tester is as follows.

First, a clearance narrowing material is applied to at least one of the inner peripheral surface of the ring and the outer peripheral surface of the rod, and the rod is inserted into the ring. With that, the rod is so positioned that the rod and the ring is in a non-contact condition (x-direction translational force Fx: 0 N), and in this condition, 0.5 mL of a fluid is injected into the upper space, and the valve of the connecting tube that connects the vacuum chamber and the lower space is opened. Accordingly, there occurs a differential pressure (50 kPa) in the clearance between the ring and the rod, and the fluid in the upper space leaks out toward the lower space via the clearance. With that, the pressure inside the vacuum chamber changes, and the pressure change ΔP is measured with the pressure measuring device. From the pressure change ΔP, the fluid leakage amount Q is calculated according to the following equation (1), and the sealing performance of the clearance narrowing material is thereby evaluated.

The equation (1) is a calculating formula for a fluid leakage amount, in which the volume change inside the vacuum chamber owing to fluid leakage is presumed to be an isothermal change.

$$Q = \frac{V_0}{\Delta t}\left(1 + \frac{P_0}{\Delta P}\right)^{-1} \quad (1)$$

$V_0$: initial volume of air inside vacuum chamber
$P_0$: initial pressure inside vacuum chamber
ΔP: pressure change after valve opening (pressure change owing to fluid leakage)
Δt: lapse of time from valve opening to measurement of pressure change (Friction Test)

Evaluation of friction characteristics using the above-mentioned narrow clearance model tester was carried out as follows.

First, a clearance narrowing material is applied to at least one of the inner peripheral surface of the ring and the outer peripheral surface of the rod, and the rod is inserted into the ring. The inserted rod is so positioned that one side of the rod is kept in contact with the inner peripheral surface of the ring and the other side of the rod is kept in contact with the lower end of the inner peripheral surface of the ring in a semi-contact condition (x-direction translational force Fx: −5 N), and in this condition, 0.5 mL of an ionic liquid is injected into the upper space. Subsequently, the rod is moved downward by 10 mm at a speed of 1 mm/s in the Z-axis direction. At this time, there occurs a slide resistance between the ring and the rod and the ring thereby receives a force. The translational force that the ring receives and the moment are measured with a 6-component dynamometer, and the frictional coefficient µ is calculated according to the following equation (2).

The equation (2) is a calculating formula for the frictional coefficient µ, in which the ring is presumed to satisfy a static balance. The operation for measuring the frictional coefficient µ was carried out after pre-conditioning interim operation of 100 times reciprocal motion of the rod.

$$\mu = \frac{F_z(z_1 - z_2)}{2M_y - F_x(z_1 + z_2)} \quad (2)$$

$F_z$, $F_x$: translational force measured by the dynamometer
$M_y$: moment measured by the dynamometer
$Z_1$: distance from the actin point of force at the upper end of ring to the dynamometer
$Z_2$: distance from the actin point of force at the lower end of ring to the dynamometer

[2] Production and Evaluation of Clearance Narrowing Material (Example 1) Production of Clearance Narrowing Material 1

First, an ATRP solution for polymerizing methyl methacrylate (MMA) through atom transfer radical polymerization is prepared according to a method described in Polymer, 49, 2008, 2426-2429. Rods (multiple rods each having a different outer diameter) and a ring to be substrates were prepared, and on the surfaces thereof, the ATRP solution was polymerized in a mode of surface-initiated living radical polymerization at 60° C. and under 500 MPa.

Specifically, in a fluororesin chamber in which methyl methacrylate (29.0 g, 4.7 mol/L), Cu(I)Br (0.132 g, 0.015 mol/L), Cu(II)Br$_2$ (0.0279 g, 0.0020 mol/L) 4,4'-dinonyl-2, 2'-bipyridine (0.937 g, 0.038 mol/L) and anisole (30.00 g) were put, a steel rod, a steel ring and a silicon wafer each having (2-bromoisobutyloxy)propyltrimethoxysilane immobilized on the surface thereof were put in an argon atmosphere. The chamber was sealed up and covered with an aluminum, bag, then put in a high-pressure reactor, and processed for polymerization at 400 MPa and 60° C. for 16 hours. After polymerization, the steel samples with CPB grafted thereon were washed a few times with tetrahydrofuran using; a shaking device. Subsequently, these were dried to give a rod and a ring with a polymer brush layer as a clearance narrowing material 1 immobilized thereon.

The samples were taken out of the reaction solution, and analyzed for the molecular weight and the dry thickness (graft amount) of the polymer brush layer according to gel permeation chromatography (elution solvent: tetrahydrofuran) and ellipsometry. The graft film formed on the silicon wafer was treated with 10% hydrofluoric acid, and the resultant free graft film was used for evaluating the molecular weight of the graft chain. As a result, the polymer brush layer formed on each surface of the rod and the ring was such that the dry thickness thereof was 1.8 µm, the number-average molecular weight (Mn) was 4,000,000, the molecular weight distribution index (PDI) was 1.53, the density of the polymer chain was 0.34 chain/nm$^2$, and the surface occupancy of the polymer chain was 19%.

In the same manner as above, a polymer brush layer having a dry thickness of 1,900 nm was formed on a silicon wafer, and swollen with an ionic liquid DEME-TFSI. The swollen layer was subjected to AFM force curve measurement with a cantilever having a spring constant of 0.1 N/m, and the equilibrium swollen film thickness was 6,400 nm and the indentation depth was 440 nm. When a cantilever having a higher spring constant is used, the compressive elasticity modulus would be more than 1 MPa.

(Evaluation 1-1) Evaluation of Sealing Performance and Friction Characteristics Against Ionic Liquid of Clearance Narrowing Material 1

The ring and the rod with the clearance narrowing material 1 formed thereon were immersed in an ionic liquid DEME-TFSI (viscosity η at 25° C.: 67 mPa·s) to swell the polymer brush layer. The ring and the rod were set in the narrow clearance model tester, in which the leakage amount Q of the liquid having leaked out through the clearance between the ring and the rod, and the friction coefficient μ between the ring and the rod were measured. Here, the test was carried out for a combination of the rod on which the clearance narrowing material 1 was formed and the ring on which the clearance narrowing material 1 was formed (rod [clearance narrowing material 1]/ring [clearance narrowing material 1]), a combination of the rod on which the clearance narrowing material 1 was formed and the ring on which the clearance narrowing material 1 was not, formed (rod [clearance narrowing material 1]/ring [steel]), a combination of the rod on which the clearance narrowing material 1 was not formed and the ring on which the clearance narrowing material 1 was formed (rod [steel]/ring, [clearance narrowing material 1]), and a combination of the rod on which the clearance narrowing material 1 was not formed and the ring on which the clearance narrowing material 1 was not formed (rod [steel]/ring [steel]), and the outer diameter of the rod was varied in every combination. As the fluid for sealing performance evaluation, an ionic liquid DEME-TFSI was used, and after the rod was inserted into the ring, the ionic liquid was injected into the top space.

In every combination, the DEME-TFSI leakage amount Q was plotted relative to the radial clearance h, and the results are shown in FIG. 3. The friction coefficient μ was plotted relative to the radial clearance h, and the results are shown in FIG. 4. From FIGS. 3 and 4, the friction coefficient μ and the leakage amount Q in the case where the radial clearance h is 15 μm, 20 μm or 40 μm were extracted, and the data were plotted on a graph where the horizontal axis indicates the leakage amount and the vertical axis indicates the friction coefficient q, as in FIG. 5.

First, from FIG. 3, the effective thickness of the polymer brush was calculated. Here, the effective thickness is a thickness of the polymer brush calculated from the leakage amount Q, and corresponds to the radial fraction substantially filled up with the polymer brush of the radial clearance h. A larger effective thickness means a higher sealing performance (a higher effect of preventing fluid leakage). Specifically, the effective thickness of the polymer brush can be determined by expressing the relational equation between the effective radial clearance (h−b) shown by the following equation (4) and the leakage amount Q as a graph and comparing it with measurement results.

Namely, when the leakage of a fluid through a clearance in the narrow clearance model tester is presumed to be a flow of a fluid that is a laminar flow and is a viscous flow running through a concentric clearance, then the relation between the leakage amount Q and the radial clearance h can be represented by the following equation (3).

$$Q=ah^3 \qquad (3)$$

As shown in FIG. 3, the fitting curve of the test results of rod [steel]/ring [steel] fits with the curve (solid line) drawn by graphing the above-mentioned equation (3) where a is $3.0\times10^{-7}$ mL/s·μm³ (determination coefficient $R^2$: 0.99). Accordingly, in the present test, a is $3.0\times10^{-7}$ mL/s·μm³.

Next, when the effective thickness of the polymer brush between the clearance is represented by b, the effective radial clearance is represented by (h−b), and the leakage amount Q is represented by the following equation (4).

$$Q=a(h-b)^3 \qquad (4)$$

The equation (4) is graphed where b is 3.5 μm, 7.0 μm or 10.5 μm, and gives curves shown by dashed lines in FIG. 3. Thus, the test results of rod [clearance narrowing material 1]/ring [clearance narrowing material 1] are almost on the curve where b=7.0 μm; and the test results of rod [clearance narrowing material 1]/ring [steel] and the test results of rod [steel]/ring [clearance narrowing material 1] are almost on the curve where b=3.5 μm.

Accordingly, the effective thickness of the polymer brush in rod [clearance narrowing material 1]/ring [clearance narrowing material 1] is 7.0 μm, and the effective thickness of the polymer brush in rod [clearance narrowing material 1]/ring [steel] and in rod [steel]/ring [clearance narrowing material 1] is 3.5 μm; that is, the effective thickness in these cases is more than 2 times the dry thickness of 1.4 μm.

From the above, it is known that, when a clearance narrowing material containing a polymer brush is used, a clearance in a fitting member structure can be efficiently filled up by swelling the material even though the solid content in the material is small, and therefore the leakage amount through the clearance can be greatly reduced as compared with that in a case not using a clearance narrowing material.

Next, as in FIG. 4 showing a relationship diagram of a frictional coefficient μ and a radial clearance h, the frictional coefficient is around 0.2 in the case of rod [steel]/ring [steel] irrespective of the radial clearance h, and is around 0.003 in the case of rod [clearance narrowing material 1]/ring [clearance narrowing material 1]. From this, it is known that the clearance narrowing material containing a polymer brush has an excellent frictional coefficient reducing effect (lubricating effect) in addition to the clearance narrowing effect, and the frictional coefficient reducing effect thereof can be realized irrespective of the radial clearance h. Further, the frictional coefficient μ in the case of rod [clearance narrowing material 1]/ring [steel] and the frictional coefficient in the case of rod [steel]/ring [clearance narrowing material 1] are 0.004 and 0.007, respectively, when the radial clearance h is 20 μm; that is, the frictional coefficient in these cases is greatly lower than that in the case of rod [steel]/ring [steel]. From this, it is known that the clearance narrowing material containing a polymer brush can exhibit a sufficient frictional coefficient reducing effect even when applied to only one member of fitting members.

Next, FIG. 5 is referred to. The leakage amount and the frictional coefficient μ in the case of rod [steel]/ring [steel] are all plotted in the right upper region in the drawing, and it is known that, in this case, the frictional coefficient is high and the sealing performance is low. On the other hand, the case of rod [clearance narrowing material 1]/ring [clearance narrowing material 1] satisfies a high sealing performance and a low frictional coefficient especially in the region where the radial clearance h is 15 μm. From this, it is known that the width of the clearance to which the clearance narrowing material is applied is preferably 15 μm or less.

(Evaluation 1-2) Evaluation of Sealing Performance Against Various Fluids of Clearance Narrowing Material 1

The same sealing performance test as that for Evaluation 1-1 was carried out except that, for the combination of rod [clearance narrowing material 1]/ring [clearance narrowing material 1], N-(2-methoxyethyl)-N-methylpyrrolidinium bis(trifluoromethanesulfonyl)imide (MEMP-TFSA) was used in place of DEME-TFSI as the ionic liquid for swelling the polymer brush and MEMP-TFSA, n-hexadecane or air was used in place of DEME-TFSI as the fluid for measuring the leakage amount Q. However, in the case where the fluid was air, the pressure change per unit hour (ΔP/Δt) at the differential pressure 30 kPa was determined in consideration of the compressibility of air, and the leakage amount was calculated according to the equation (1). Also for the combination of rod [steel]/ring [steel], the same sealing performance test was carried out using MEMP-TFSA, n-hexadecane or air as the fluid.

For each combination, the MEMP-TFSA leakage amount Q was plotted relative to the radial clearance h, and the results are shown in FIG. 6 the n-hexadecane leakage amount Q was plotted relative to the radial clearance h and the results are shown in FIG. 7; and the air leakage amount Q was plotted relative to the radial clearance h and the results are shown in FIG. 8. In each diagram, the equation (4) where h is 0 μm, 3.5 μm, 7.0 μm or 10.5 μm is graphed as solid lines.

From FIG. 6 to 8, it is known that the clearance narrowing material which the polymer brush was swollen with MEMP-TFSA expresses a clearance narrowing effect corresponding to an effective thickness of 7 μm against every fluid. This confirms that the clearance narrowing material can be swollen with various ionic liquids to function as a clearance narrowing material and further that the clearance narrowing material can prevent not only leakage of ionic liquids but also leakage of any other liquid than ionic liquids and further can prevent leakage of vapor.

(Example 2) Production of Clearance Narrowing Material 2

A methacrylate polymer having a living radical polymerization initiation group as a side chain, poly(2-(2-bromo-2-methylpropanoyloxy)ethyl methacrylate) was used as a macro-initiator. The macro-initiator has a polymethyl methacrylate-equivalent main chain polymerization degree of 200. Using the macro-initiator in living radical polymerization, a bottle brush having, as introduced as the side chain thereinto, methyl methacrylate (hereinafter abbreviated as MMA) and 3-methacryloxypropyltriethoxysilane (hereinafter abbreviated as MOPES) was synthesized.

First, 520.8 g of diethylene glycol dimethyl ether was charged in a separable flask, and then in a nitrogen gas atmosphere, 11.2 g (0.040 mol as an initiator group) of poly(2-(2-bromo-2-methylpropanoyloxy)ethyl methacrylate) was added thereto and dissolved with stirring at room temperature. Next, 11.8 g (0.032 mol) of tetra-n-butylammonium iodide (hereinafter abbreviated as TBAI) was added, then heated up to 80° C., and 200.2 g (2.00 mol) of MMA was added and polymerized at the temperature for 5 hours. The conversion rate as calculated from the weight change in heating at 180° C. for 90 seconds until no weight change could be detected was 52.6%. As a result of molecular weight measurement through GPC using a THF solvent (apparatus name: Shodex GPC-1011 with two columns of KF-606L connected in series, eluent: THF, flow rate: 1.0 mL/min), polymethyl methacrylate-equivalent Mn was 281900, and PDI was 1.77. The polymer was precipitated using methanol and purified through repeated reprecipitation and collection to give a bottle brush 1 having polymethyl methacrylate side chains (hereinafter expressed as BB-1). Considering the charge-in TBAI amount and presuming that 80% of the polymerization initiation group of the macro-initiator was converted into iodides and graft chains grew from all of them, the number-average polymerization degree of the side chains was calculated to be 33 from the conversion rate.

Next, 164.6 g of diethylene glycol dimethyl ether was charged in a separable flask, and then in a nitrogen gas atmosphere, 19.4 g of BB-1 was added thereto and dissolved with stirring at room temperature. Next, 1.8 g (0.032 mol) of TBAI was added, then heated up to 80° C., and 25.0 g (0.25 mol) of MMA and 25.0 g (0.086 mol) of MOPES wee added and polymerized at the temperature for 5 hours. According to a volatility method, the conversion rate was calculated to be 47.6%. As a result of molecular weight measurement through GPC using a THF solvent, polymethyl methacrylate-equivalent Mn was 358400 and PDI was 1.62. The polymer was precipitated using methanol and purified through reprecipitation and collection to give a bottle brush as the intended clearance narrowing material 2. Presuming that all the growing ends of BB-1 were deactivated through photoirradiation, that all the remaining polymerization initiation groups were iodized and second side chains were introduced, and that MMA and MOPES were grafted on the same level, the number-average polymerization degree of the side chains was calculated to be 20 from the conversion rate.

Presuming that all the polymerization initiation groups of the bottle brush grafted, the surface occupancy of the graft side chain was calculated to be 5%.

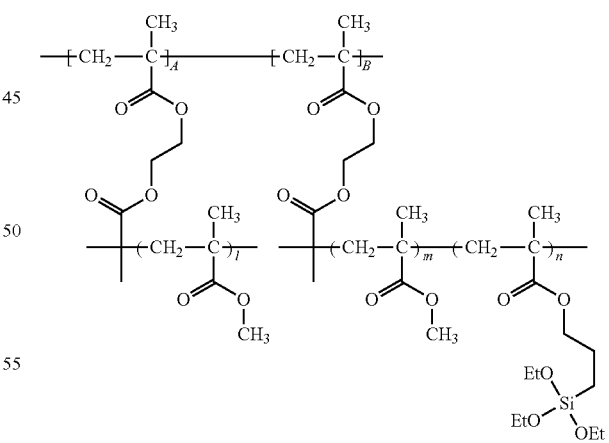

Next, the rods (rods having a different outer diameter) were ultrasonically washed, then irradiated with UV rays in vacuum for 10 minutes, and immersed in an ethanol solution of ammonia (0.24 mold) and tetraethyl orthosilicate (0.03 mol/L), and statically left as such overnight and reacted. The thus-processed rods were immersed in a propylene glycol monomethyl ether acetate solution of the bottle brush (10% by weight), then drawn up at 500 μm/sec, and left to stand as such and dried, and then further annealed overnight under reduced pressure at 120° C. As a result of the process, a clearance narrowing material 2 of a film of the bottle brush was formed on the surface of each rod. The film thickness of the bottle brush was measured through ellipsometry and was 1442 nm.

(Evaluation 2-1) Evaluation of Sealing Performance of Clearance Narrowing Material 2

The rod on which the clearance narrowing material 2 had been formed was immersed in an ionic liquid MEMP-TFSI for 24 hours to swell the bottle brush in the material. The rod on which the clearance narrowing material 2 had been formed and an unprocessed ring on which the clearance narrowing material 2 had not been formed (rod [clearance narrowing material 2]/ring [steel]) each were set in a narrow clearance model tester, and subjected to a sealing performance test. Here, MEMP-TFSI was used as a liquid for sealing performance evaluation. The test was carried out for every rod having a different outer diameter to investigate the influence of the radial clearance h on the MEMP-TFSI leakage amount Q. In addition, the combination of rod (steep/ring (steel) was also tested in the same sealing performance test.

For every combination, the MEMP-TFSI leakage amount Q was plotted relative to the radial clearance h and the results are shown in FIG. 9. In FIG. 9, also shown are curves grafted from the equation (4) where b is 0 μm, 2 μm, 4 μm or 6 μm, as solid lines.

From FIG. 9, it is known that the test results of the leakage amount Q in the combination of (rod [clearance narrowing material 2]/ring [steel]) are almost on the curve of the equation (4) where b is 2 μm and that the clearance narrowing material 2 realizes a clearance narrowing effect corresponding to an effective thickness of 2 μm. This confirms that the bottle brush is also useful as a clearance narrowing material.

Further, the clearance narrowing materials 1 and 2 were subjected to a wear resistance test with a ball-on-disc, in which little wear was recognized in both the materials. This confirms that these clearance narrowing materials have excellent wear resistance.

INDUSTRIAL APPLICABILITY

Using the clearance narrowing material of the present invention, fluid leakage through a clearance can be effectively prevented. In addition, when one member moves relatively to the other member forming a clearance, the clearance narrowing material of the present invention can contribute toward realizing smooth movement without disturbing the movement of the two. Consequently, the clearance narrowing material of the present invention can be effectively used as a sealing material to be arranged in a clearance in an article having a clearance through which a fluid may pass and having the necessity of preventing fluid leakage through the clearance, as well as in an article in which a pair of members to form a clearance move in a mode of reciprocating slide movement. Accordingly, the industrial applicability of the clearance narrowing material of the present invention is great.

The invention claimed is:

1. A clearance narrowing material comprising a brush-shaped polymer chain aggregate formed of multiple polymer chains immobilized on a substrate, wherein:

the polymer chains have a density of 0.02 chain/nm$^2$ or more, and the polymer chain aggregate has a film thickness in a swollen state that is 1.5 times or more of a dry film thickness of the polymer chain aggregate.

2. The clearance narrowing material according to claim 1, wherein the substrate is a carrier.

3. The clearance narrowing material according to claim 2, wherein the shape of the substrate is a sheet-like, particulate or fibrous one.

4. The clearance narrowing material according to claim 2, wherein the substrate is at least one member of a fitting member structure formed by fitting a pair of members into each other, and the multiple polymer chains are immobilized on at least the face that opposes the other member of the pair of members, among the surfaces of the one member.

5. The clearance narrowing material according to claim 1, wherein the substrate is a polymer chain, and the multiple polymer chains bond to the polymer chain of the substrate, as side chains thereto.

6. The clearance narrowing material according to claim 5, wherein the polymer chain of the substrate and the polymer chain aggregate of multiple polymer chains form a bottle brush-shaped structure.

7. The clearance narrowing material according to claim 1, wherein the surface occupancy of the polymer chains is 5% or more.

8. The clearance narrowing material according to claim 1, wherein the polymer chain aggregate is impregnated and swollen with a liquid substance.

9. The clearance narrowing material according to claim 1, which has a compressive elasticity modulus of 1 MPa or more and a frictional coefficient (μ) of 0.1 or less.

10. The clearance narrowing material according to claim 1, which has an indentation depth of 100 nm or more and a compressive elasticity modulus of 1 MPa or more.

11. A clearance narrowing material composite having a clearance narrowing material according to claim 1 and a substrate with the clearance narrowing material immobilized thereon.

12. The clearance narrowing material composite according to claim 11, wherein the substrate is a sheet, a granulate material, a fibrous material, or at least one member of a fitting member structure formed of a pair of members fitting into each other.

13. An article having a pair of members arranged to face each other and having a clearance between the opposing faces of the pair of members, wherein:

a clearance narrowing material according to claim 1 is immobilized on at least one of the opposing faces of the pair of members.

14. The article according to claim 13, wherein the pair of members are a fitting member structure.

15. The article according to claim 13, wherein the width of the clearance is 15 μm or less.

16. The article according to claim 13, wherein the ratio of the effective thickness b in the following expression (4) to the total width of the clearance is 20% or more, $$Q=a(h-b)^3 \tag{4}$$

wherein h represents a radial clearance(μm);Q represents an amount (mL) of a liquid leaking from the clearance when the clearance narrowing material is immobilized on the surface of a member that forms the clearance and then a liquid is put on an opening of the clearance; a represents a coefficient (mL/sec·μm$^3$) to be defined from experimental conditions (differential pressure in clearance, liquid viscosity, clearance length, clearance outer diameter); and b represents an effective thickness of the clearance narrowing material in the clearance.

17. The clearance narrowing material according to claim 1, wherein the dry film thickness of the polymer chain aggregate is at least 1000 nm.

18. The clearance narrowing material according to claim 1, wherein the polymer chain aggregate has a molecular weight distribution index(Mw/Mn) of 1.5 or less.

* * * * *